US012510680B2

(12) United States Patent
Borg et al.

(10) Patent No.: US 12,510,680 B2
(45) Date of Patent: Dec. 30, 2025

(54) SATELLITE-ENABLED NODE FOR AMBIENT NOISE TOMOGRAPHY

(71) Applicant: Fleet Space Technologies Pty Ltd, Beverley (AU)

(72) Inventors: Braeden James Borg, Beverley (AU); Matthew James Pearson, Beverley (AU)

(73) Assignee: Fleet Space Technologies PTY LTD, Adelaide Airport (AU)

( * ) Notice: Subject to any disclaimer, the term of this patent is extended or adjusted under 35 U.S.C. 154(b) by 0 days.

(21) Appl. No.: 18/592,916

(22) Filed: Mar. 1, 2024

(65) Prior Publication Data

US 2024/0255661 A1 Aug. 1, 2024

Related U.S. Application Data

(63) Continuation of application No. 17/941,203, filed on Sep. 9, 2022, now Pat. No. 11,953,636.

(30) Foreign Application Priority Data

| Mar. 4, 2022 | (AU) | 2022900533 |
| Mar. 18, 2022 | (AU) | 2022900680 |
| Jul. 28, 2022 | (AU) | 2022209325 |

(51) Int. Cl.
*G01V 1/22* (2006.01)
*G01V 1/18* (2006.01)
(Continued)

(52) U.S. Cl.
CPC .............. *G01V 1/223* (2013.01); *G01V 1/181* (2013.01); *G01V 1/345* (2013.01); *G01V 1/364* (2013.01); *H04B 7/18513* (2013.01)

(58) Field of Classification Search
CPC ........ G01V 1/223; G01V 1/181; G01V 1/345; G01V 1/008; G01V 1/003; H04B 7/18513
See application file for complete search history.

(56) References Cited

U.S. PATENT DOCUMENTS

| 5,627,798 A | 5/1997 | Siems et al. |
| 6,078,283 A | 6/2000 | Bednar |
(Continued)

FOREIGN PATENT DOCUMENTS

| AU | 2009314458 B2 | 7/2014 |
| AU | 2011248992 B2 | 9/2014 |
(Continued)

OTHER PUBLICATIONS

Examination report No. 1 for standard patent application AU 2022209325. Dated Sep. 19, 2022. 12 pages.
(Continued)

*Primary Examiner* — An H Do
(74) *Attorney, Agent, or Firm* — Nelson Mullins Riley & Scarborough LLP

(57) ABSTRACT

Embodiments relate to data acquisition units or nodes and more specifically to seismic data acquisition units or nodes for use in data gathering for ambient noise tomography (ANT). Some embodiments relate to a method for data acquisition, and systems employing one or more data acquisition units. Some embodiments relate to systems comprising one or more satellites in communication with one or more data acquisition units for communication to a remote server, for remote storage, and processing for creating sub-surface tomography images accessible to client devices.

20 Claims, 20 Drawing Sheets

(51) Int. Cl.
  *G01V 1/34* (2006.01)
  *G01V 1/36* (2006.01)
  *H04B 7/185* (2006.01)

(56) References Cited

U.S. PATENT DOCUMENTS

| | | |
|---|---|---|
| 8,296,067 B2 | 10/2012 | Ross et al. |
| 9,297,925 B1 | 3/2016 | Riley |
| 10,634,765 B1 | 4/2020 | Acker et al. |
| 11,774,944 B2 | 10/2023 | Cella et al. |
| 2005/0114033 A1 | 5/2005 | Ray et al. |
| 2005/0276162 A1 | 12/2005 | Brinkmann et al. |
| 2008/0082701 A1 | 4/2008 | Pavel et al. |
| 2008/0137484 A1 | 6/2008 | Scott |
| 2009/0234585 A1 | 9/2009 | Ross et al. |
| 2010/0309747 A1 | 12/2010 | Mizutani et al. |
| 2012/0082002 A1 | 4/2012 | Iseli |
| 2012/0316792 A1 | 12/2012 | Liu et al. |
| 2014/0169252 A1 | 6/2014 | Banerjee et al. |
| 2014/0219051 A1 | 8/2014 | Pavel |
| 2015/0260864 A1 | 9/2015 | Guichard et al. |
| 2016/0374226 A1 | 12/2016 | Ray et al. |
| 2019/0383958 A1 | 12/2019 | Jamali Rad et al. |
| 2021/0080603 A1 | 3/2021 | Dabouineau et al. |

FOREIGN PATENT DOCUMENTS

| | | |
|---|---|---|
| AU | 2012268718 B2 | 4/2015 |
| AU | 2012266874 B2 | 6/2015 |
| AU | 2012222851 B2 | 11/2015 |
| AU | 2014396225 A1 | 11/2016 |
| AU | 2013318272 B2 | 1/2018 |
| AU | 2014396231 B2 | 2/2018 |
| AU | 2017279450 A2 | 1/2019 |
| AU | 2015268879 B2 | 8/2019 |
| AU | 2018335566 B2 | 2/2020 |
| AU | 2018219188 B2 | 2/2021 |
| AU | 2019420582 A1 | 9/2021 |
| AU | 2015406809 B2 | 10/2021 |
| AU | 2021106916 A4 | 11/2021 |
| AU | 2020365520 A1 | 4/2022 |
| CA | 2746753 A1 | 2/2012 |
| CN | 208297749 U | 12/2018 |
| CN | 110942610 A | 3/2020 |
| CN | 112987083 A | 6/2021 |
| WO | WO 2019/111070 A | 6/2019 |
| WO | WO 2020/029397 A1 | 2/2020 |
| WO | WO 2020/029398 A1 | 2/2020 |
| WO | WO 2020/226506 A1 | 11/2020 |
| WO | WO 2021/022882 A1 | 2/2021 |
| WO | WO 2021/033056 A1 | 2/2021 |
| WO | WO 2021/050122 A1 | 3/2021 |
| WO | WO 2021/127186 A1 | 6/2021 |
| WO | WO 2021/127670 A1 | 6/2021 |
| WO | WO 2021/162683 A1 | 8/2021 |
| WO | WO 2021/165660 A1 | 8/2021 |
| WO | 2021/178286 A1 | 9/2021 |
| WO | WO 2021/177933 A1 | 9/2021 |
| WO | WO 2021/216711 A1 | 10/2021 |
| WO | WO 2021/231457 A1 | 11/2021 |
| WO | WO 2021/247562 A1 | 12/2021 |
| WO | WO 2021/253089 A1 | 12/2021 |
| WO | WO 2021/260563 A3 | 12/2021 |
| WO | WO 2022/015304 A1 | 1/2022 |
| WO | WO 2022/026827 A1 | 2/2022 |
| WO | WO 2022/040337 A1 | 2/2022 |
| WO | WO 2022/066445 A1 | 3/2022 |
| WO | WO 2022/066446 A1 | 3/2022 |
| WO | WO 2022/066447 A1 | 3/2022 |
| WO | WO 2022/066620 A1 | 3/2022 |
| WO | WO 2022/067175 A1 | 3/2022 |
| WO | WO 2022/069441 A1 | 4/2022 |
| WO | WO 2022/072951 A1 | 4/2022 |
| WO | WO 2022/076511 A1 | 4/2022 |

OTHER PUBLICATIONS

Examination report No. 2 for standard patent application AU2022209325. Dated Nov. 9, 2022. 5 pages.
Havskov, J., et al., "Seismic Networks", 2012, New Manual of Seismological Observatory Practice 2 (NMSOP-2), Potsdam: Deutsches GeoForschungsZentrum GFZ, pp. 1-65.
Skritek, P., et al., "Environmental Data-Transmission using Low Earth Orbit Satellites", Proc. 16th Int. Conf. EnviroInfo2002, pp. 727-734. (2002).
Gomez, C., et al., "On the Energy Performance of Iridium Satellite IoT Technology", Sensors, 21(21), 7235, (2021).
"Modem Technology"; Retrieved Jan. 10, 2017 from https://web.archive.org/web/20170110155216/https://www.satelliteevolutiongroup.com/articles/Modem-Technology.pdf.
Jamali-Rad, H., et al., "Continuous Subsurface Tomography Over Cellular Internet of Things (IoT)", IEEE Sensors Journal, vol. 20, No. 17, pp. 10079-10091. (2020).
Valero, M., et al., "Real-time cooperative analytics for ambient noise tomography in sensor networks", IEEE transactions on signal and information processing over networks, 5.2, pp. 375-389. (2019).
International Search Report and Written Opinion of PCT/AU2022/051411. Dated Feb. 23, 2023. 26 pages.
Gao, P. et al., "Design of Distributed Three Component Seismic Data Acquisition System Based on LoRa Wireless Communication Technology". 37th Chinese Control Conference (CCC), pp. 10285-10288. (2018).
Lysogor, I. et al., "Study of Data Transfer in a Heterogeneous LoRaSatellite Network for the Internet of Remote Things". Sensors 2019, vol. 19, Issue No. 15, Aug. 1, 2019, Article No. 3384. (2019).
NuSeis GTI Field Operation Manual v2_3. (2021).
Fleet—Geosphere Trifold Brochure [Print].pdf. (2022).
Fleet—Mining Trifold 658x160mm [Preview] (1).pdf. (2022).
Fleet—Defence Trifold 658x160mm_TOTLD Edit_Print_v4.pdf. (2022).
Fleet—Mining Trifold 658x160mm_TOTLD Edit_Print_v3.pdf. (2022).
G. Olivier, et al. "Fleet's Geode: A Breakthrough Sensor for Real-Time Ambient Seismic Noise Tomography over DtS-IoT". Sensors, 22, 8872, (2022).
"Exploration at the Speed of Light—Fleet Space.pdf". (2022).
"Innoseis—Quantum"; Retrieved Apr. 14, 2023 from: https://web.archive.org/web/20220120104240/www.innoseis.com/quantum/.
"Innoseis—Quantum"; Retrieved Apr. 14, 2023 from: https://az659834.vo.msecnd.net/eventsairwesteuprod/production-eage-public/e45cd09c0bd7402f98a46101e584daa6.
"Sisprobe—Smartsolo"; Retrieved Apr. 14, 2023 from: http://www.sisprobe.com/wp-content/uploads/2020/08/smartsolo-igu-16hr-3c_en-brochure.pdf.
"Seismic Source"; Retrieved Apr. 14, 2023 from: https://web.archive.org/web/20211128202255/seismicsource.com/html/featured.
Dean, T., et al., "Recent advances in nodal land seismic acquisition systems", ASEG Extended Abstracts, 2019:1, 1-4, (2019).
Dean, T., et al., "Nodal land seismic acquisition: The next generation", First Break, vol. 36, pp. 47-52. (2018).
Curtis, A. et al., "Seismic interferometry—turning noise into signal", The Leading Edge. (2006).
Aki, Keiiti, "Space and time spectra of stationary stochastic waves, with special reference to microtremors", Earthquake Research Institute for 1957, vol. XXXV, pp. 415-456. (1957).
Claerbout, Jon F., "Synthesis of a layered medium from its acoustic transmission response", Geophysics, 33(2), pp. 264-269. (1968).
Hand, Eric, "A boom in boomless seismology", Science vol. 345, issue 6198. (2014).
Hollis, D., et al. "Use of ambient-noise surface-wave tomography in mineral resource exploration and evaluation", SEG International Exposition and 86th Annual Meeting, pp. 1938-1940. (2018).
Dales, P., et al., "Virtual Sources of Body Waves from Noise Correlations in a Mineral Exploration Context", Seismological Research Letters, vol. XX(XX), (2020).
Ryberg, T., et al., "Ambient seismic noise analysis of Large-N data for mineral exploration in the Central Erzgebirge, Germany", Solid Earth, vol. 13, pp. 519-533. (2022).

(56) References Cited

OTHER PUBLICATIONS

A. Boué et al., "Vs imaging from ambient noise Rayleigh wave tomography for oil exploration in Nevada, USA", SEG International Exposition and 89$^{th}$ Annual Meeting, pp. 5382-5385. (2019).
Zhou, C., et al., "Near-surface geothermal reservoir imaging based on the customized dense seismic network", Surveys in Geophysics (2021), 42:673-697. (2021).
Mordret, A., et al. "Shallow three-dimensional structure of the San Jacinto fault zone revealed from ambient noise imaging with a dense seismic array", Geophy J. Int (2019), 216:896-905. (2018).
Brenguier, F., et al., "Toward 4D noise-based seismic probing of volcanoes: Perspectives from a large-N experiment on Piton de la Fournais", Seismological Research Letters, vol. 97(1), pp. 15-25. (2016).
Olivier, G., et al., "Ambient noise Love wave tomography at a gold mine tailings storage facility", Géotechnique Letters, vol. 8, pp. 178-182. (2018).
Wang, Y., et al., "Road sinkhole detection with 2D ambient noise tomography", Geophysics, vol. 86(6), pp. KS123-KS135. (2021).
Zecka, M., et al. "Sensitivity, Accuracy and Limits of the Lightweight Three-Component SmartSolo Geophone Sensor (5 Hz) for Seismological Applications", (2022).
Ringler, A. T., et al., "Laboratory Tests of Three Z-Land Fairfield Nodal 5-Hz, Three-Component Sensors", Seismological Research Letters, vol. 89(5). (2018).
Dean, T. et al., "Methods for reducing unwanted noise (and increasing signal) in passive seismic surveys", AEGC, 8 pages. (2018).
Makama, A., et al., "Wireless Geophone Networks for Land Seismic Data Acquisition: A Survey, Tutorial and Performance", Sensors, vol. 21, 5171, 21 pages. (2021).
Shixue, L., et al. "Development and prospect of the nodal cable-free seismograph: a review", 2022 Meas. Sci. Technol., vol. 33. (2022).
Valero, M., et al., "Smart seismic network for shallow subsurface imaging and infrastructure security", Int. J. of Sensor Networks, vol. x(x). (2019).
Sepul Veda, F., et al., "The Edge of Exploration: An Edge Storage and Computing Framework for Ambient Noise Seismic Interferometry Using Internet of Things Based Sensor Networks", Sensors, vol. 22, 3615. (2022).
Fairhurst, G., et al., "First: Future Internet—a role for satellite technology", IEEE International Workshop on Satellite and Space Communications. (2008).
Madakam, S., et al., "Internet of Things (IoT): A Literature Review", Journal of Computer and Communications, vol. 3, pp. 164-173. (2015).
Fraire, J., et al., "Direct-To-Satellite IoT—A Survey of the State of the Art and Future Research Perspectives: Backhauling the IoT Through LEO Satellites", International Conference on Adhoc, Mobile and Wireless Networks, Lecture Notes in Computer Science 11803, pp. 241-258. (2019).
Dai, K., et al., "A Low-Cost Energy-Efficient Cableless Geophone Unit for Passive Surface Wave Surveys", Sensors, vol. 15, pp. 24698-24715. (2015).
Hoffman, Jennifer E. "A Search for Alternative Electronic Order in the High Temperature Superconductor Bi2Sr2CaCu208+[delta] by Scanning Tunneling Microscopy", dissertations submitted in partial satisfaction of the requirements for the degree of Doctor of Philosophy in Physics, Graduate Division of the University of California, Berkeley, Fall 2003, 171 pages. (2003).
Peterson, Jon, "Observations and modeling of seismic background noise", US Dept. of Interior Geological Survey, openOfile report 93-322, 94 pages. (1993).
Sleeman, R., et al., "Three-Channel Correlation Analysis: A New Technique to Measure Instrumental Noise of Digitizers and Seismic Sensors", Bulletin of the Seismological Society of America, vol. 96(1), pp. 258-271. (2016).
Bensen, G. D., et al., "Processing seismic ambient noise data to obtain reliable broad-band surface wave dispersion measurements", Geophys. J. Int., vol. 169, pp. 1239-1260. (2007).
Luo, Y., et al., "Evaluating Uncertainties of Phase Velocity Measurements from Cross-Correlations of Ambient Seismic Noise", Seismological Research Letters, vol. 91(3), pp. 1515-1729. (2020).
Xie, J., et al., "Improving cross-correlations of ambient noise using an rms-ratio selection stacking method", Geophys. J. Int., vol. 222, pp. 989-1002. (2020).
Zaner, D., et al., "Ultrasound Image Optimization ("Knobology"): B-Mode", Ultrasound Int Open, vol. 6:E14-E24. (2020).
Gould, T. L. et al., "Infill Drilling for Incremental Recovery", Journal of Petroleum Technology, pp. 229-237. (1989).
Fatchi, M., et al., "Designing infill directional drilling in mineral exploration by using particle swarm optimization", Arab J. Geosci, vol. 10:487, 14 pages. (2017).
Spica, Z., et al., "3-D shear wave velocity model of Mexico and South US: bridging seismic networks with ambient", Geophys. J. Int., vol. 206, pp. 1795-1813. (2016).
Examination report No. 3 for standard patent application AU 2022209325. Dated Feb. 28, 2023. 6 pages.
"GEO-S120 Broadband Seismic Sensor;" *Exact Global Teknologi*; retreived Jun. 7, 2023 from https://web.archive.org/web/20220808043247/https:/www.exactglobal.co.id/seismic-sensors-3/.
Goldswain, G. "Advances in seismic monitoring technologies", Proceedings of the Second International Conference on Underground Mining Technology, Australian Centre for Geomechanics, Perth, pp. 173-188 (2002).
Legovini, P.; "Ambient seismic noise tomography of the Antarctic continent;" Dissertation thesis; University of Bologna; PhD in Geophysics; 2019.

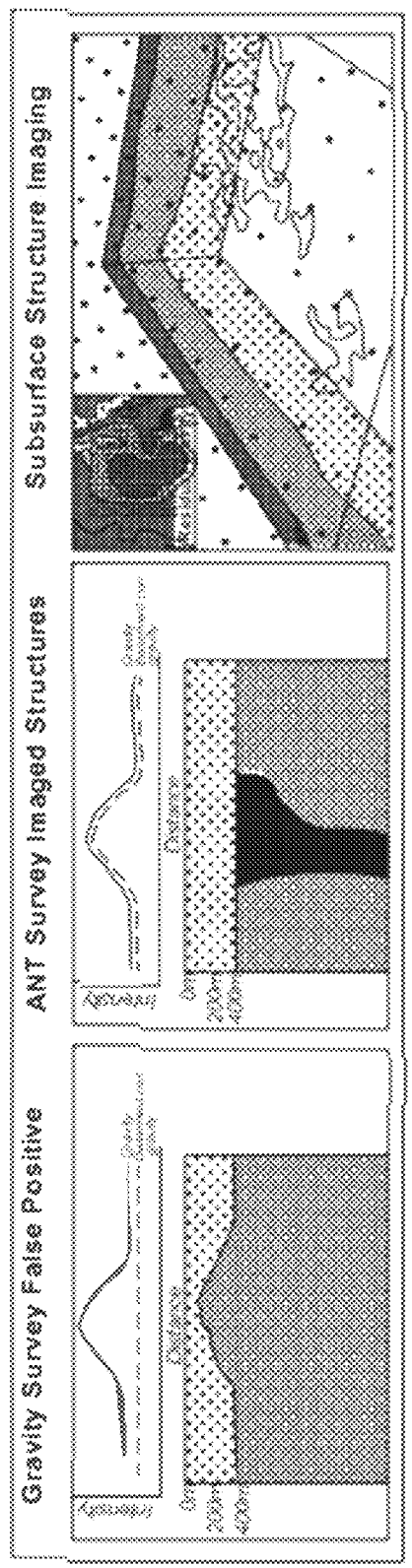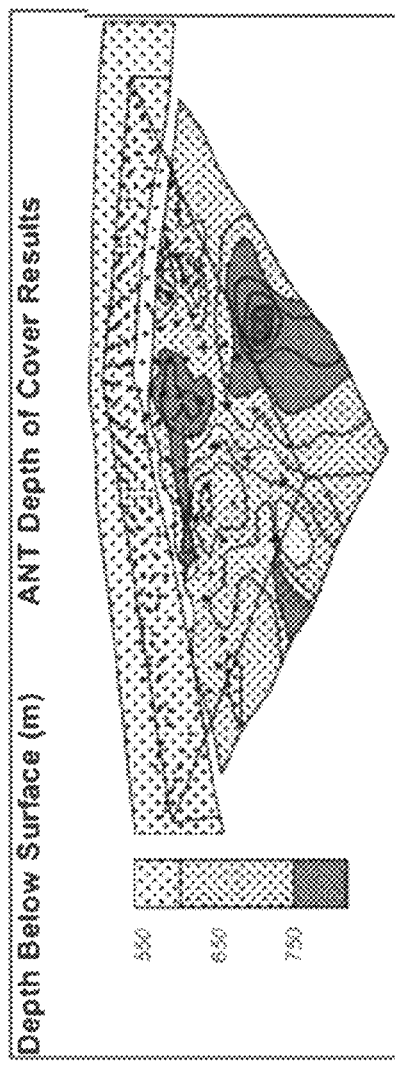

SATELLITE-ENABLED NODE FOR AMBIENT NOISE TOMOGRAPHY

CROSS-REFERENCE TO RELATED APPLICATIONS

This application claims priority to and is a continuation of U.S. patent application Ser. No. 17/941,203, filed Sep. 9, 2022; which claims priority under 35 U.S.C. § 119(a) to Australian patent application No. 2022209325, filed Jul. 28, 2022; claims priority under 35 U.S.C. § 119(a) to Australian patent application No. 2022900680, filed Mar. 18, 2022; and claims priority under 35 U.S.C. § 119(a) to Australian patent application No. 2022900533, filed Mar. 4, 2022; each of which are hereby incorporated by reference in their entireties.

TECHNICAL FIELD

Embodiments relate to data acquisition units or nodes and more specifically to seismic data acquisition units or nodes for use in data gathering for ambient noise tomography (ANT). Some embodiments relate to a method for data acquisition, and systems employing one or more data acquisition units. Some embodiments relate to systems comprising one or more satellites in communication with one or more data acquisition units for communication to a remote server, for remote storage, and processing for creating sub-surface tomography images accessible to client devices.

BACKGROUND

Data acquisition for ambient noise tomography processing can be a time consuming endeavour. Ambient noise tomography requires continuous sampling. There may be significant latency from deploying data acquisition sensors and subsequently collecting the data measured from the data acquisition sensors to producing ambient noise tomography images, which can take from several weeks to several months. Furthermore, the data acquisition sensors for ambient noise tomography may need to be deployed in remote and/or harsh environments which can present various challenges. In remote and harsh environments without a power supply, there may be data storage and power constraints associated with data acquisition for ambient noise tomography.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a data acquisition unit, including:
 a housing;
 a ground movement data acquisition mechanism configured to measure ground movement;
 a processing unit communicatively coupled to the ground movement data acquisition mechanism,
 wherein the processing unit is configured to receive ground movement data sent from ground movement data acquisition mechanism, the processing unit further configured to pre-process the ground movement data before transmitting, via a satellite modem, to a communicatively coupled LEO satellite the pre-processed data based on a scheduled timing of the LEO satellite reaching a scheduled orbital position.

The ground movement data acquisition mechanism and processing unit may continuously acquire and preprocess ground movement data and transmit all or almost all the pre-processed data to a remote server system via the low earth orbit satellite for performing ANT.

Pre-processing the ground movement data may include one-bit normalisation.

Pre-processing the ground movement data may further include de-trending the ground movement data. Pre-processing the ground movement data may further include low-pass filtering. Pre-processing the ground movement data may further includes decimating by a pre-determined factor that depends on a sampling rate. The factor may be two where the sampling rate is 25 Hz, for example. Pre-processing the ground movement data may further includes spectral whitening. The de-trending may be performed first, followed by decimating by a pre-determined factor, followed by low-pass filtering, followed by spectral whitening, followed by one-bit normalisation.

Some embodiments relate to a data acquisition unit for ambient noise tomography (ANT), including:
 a closed housing including a top portion, a central portion and a lower portion, the lower portion including a vibration sensing portion for sensing vibration in a ground region;
 a vibration transducer in the housing and configured to receive vibrations via the vibration sensing portion and generate an electrical output signal based on the received vibrations;
 a processing unit in the housing to receive and process the electrical output signal to generate a compressed data payload;
 a synchronisation unit to receive a synchronisation signal from a satellite and to communicate synchronisation data to the processing unit based on the synchronisation signal;
 a satellite modem communication port positioned on top of the top portion for allowing communication between a satellite modem and the processing unit to transmit the data payload to a low earth orbit satellite; and
 a power supply in the central portion to supply power to the processing unit, the satellite modem and the synchronisation unit.

The vibration transducer may include a geophone positioned in the vibration sensing unit. The vibration sensing unit may include a metal spike or probe having one end received in the lower portion and a free opposite end for extending into part of the ground region. The power supply or power source may consist of a rechargeable battery module centrally positioned within the housing. The processing unit or processor may be disposed between the power supply or power source and the ground movement sensing module, sensing probe, vibration transducer or the vibration sensing portion.

The unit may further include a low-power wide-area network (LPWAN) antenna connection jack in a top portion of the housing for coupling a LPWAN antenna to the processing unit.

The processing unit or processor may be configured to buffer payload data for a pre-determined period of time less than 12 hours. The satellite modem may be configured to transmit the data payload to a remote server in near-real time.

The processing unit or processor may send the data payload at a randomised time within a scheduled transmission period. The randomised time may be based on a unique key. The unique key may be a hardware serial number of the satellite modem.

The data acquisition unit may further include an inertial measurement unit for measuring an attitude and/or orientation of the data acquisition unit, wherein the processing unit or processor batches the attitude and/or orientation data in a payload for transmission so that the attitude and/or orientation, or a change of attitude and/or orientation, of the data acquisition unit, can be visualised on or alarmed to a user device.

The data acquisition unit may further include a removable auxiliary memory for storing the data payload for data recovery or re-transmission of one or more of the data payloads upon communication and/or component failure.

Some embodiments relate to a method of seismic data acquisition, including:
  positioning a plurality of data acquisition units according to any one of the described data acquisition unit embodiments at spaced surface locations across a ground region; and
  operating each of the plurality of data acquisition units to receive vibrations over a plurality of days;
  wherein the plurality of data acquisition units are operable to generate and send to a satellite processed data based on vibrations received by the data acquisition units at the spaced surface locations.

The operating may include continuous operation of the data acquisition units to receive vibrations. The operating may include continuous operation of the data acquisition units to receive vibrations for a period of between 4 and 10 days. A power supply or power source of each data acquisition unit may be contained within the housing of each data acquisition unit and may be configured to supply power for operation of the respective data acquisition unit for up to 10 days. In some embodiments, the power supply or power source of each data acquisition unit may be configured to supply power for operation of the respective data acquisition unit for up to 10 days. In some embodiments, the power supply or power source of each data acquisition unit may be configured to supply power for operation of the respective data acquisition unit for greater than 10 days.

Some embodiments relate to a server system, including: a data communications module for receiving from a plurality of data acquisition units pre-processed ground movement data based on ground movement in a ground region sensed by each of the plurality of data acquisition units; a data processing module for performing ambient noise tomography to generate tomography data based on the ground-movement data; and a data visualisation module for generating a display of the ground region based on the tomography data viewable from a communicatively coupled user interface in near-real time relative to a data acquisition time of the ground movement.

The pre-processed ground movement data may be received from the data acquisition unit via communications of a low earth orbit satellite.

Also disclosed herein is a data acquisition unit or node for ambient noise tomography (ANT), including:
  a closed housing including a top portion, a central portion and a lower portion, the lower portion including a vibration sensing portion for sensing vibration in a ground region;
  a vibration transducer in the housing and configured to receive vibrations via the vibration sensing portion and generate an electrical output signal based on the received vibrations;
  a processing unit in the housing to receive and process the electrical output signal to generate a compressed data payload;
  a synchronisation unit to receive a synchronisation signal from a satellite and to communicate synchronisation data to the processing unit based on the synchronisation signal;
  a satellite modem positioned on top of the top portion and in communication with the processing unit to transmit the compressed data payload to a satellite; and
  a power supply in the central portion to supply power to the processing unit, the satellite modem and the synchronisation unit.

Also disclosed herein is a data acquisition unit including:
  a housing;
  a ground movement sensing module, the ground movement sensing module either contained in the housing or coupled to the housing;
  a processing unit contained in the housing, the processing unit being communicatively coupled to the ground movement sensing module to receive ground movement data from the ground movement sensing module, the processing unit further configured to preprocess the ground movement data before transmitting the preprocessed data to a satellite modem for transmission to a low earth orbit (LEO) satellite;
  wherein preprocessing the ground movement data comprises at least 8:1 up to 32:1 compression ratio of the ground movement data. In other words, preprocessing the ground movement data comprises compressing the ground movement data at a compression ratio of at least 8:1 up to 32:1.

Also disclosed herein is a data acquisition unit, including:
  a housing;
  a ground movement data acquisition mechanism;
  a processing unit communicatively coupled to the ground movement data acquisition mechanism, the processing unit configured to receive ground movement data measured and sent by the ground movement data acquisition mechanism, the processing unit further configured to pre-process the ground movement data before transmitting the pre-processed data;
  wherein pre-processing the ground movement data includes one-bit normalisation.

Also disclosed herein is a data acquisition unit, including:
  a housing including an outer wall, a top part and a bottom part, wherein the outer wall, the top part and the bottom part together define an interior volume of the housing;
  a sensing probe extending from the bottom part of the housing;
  a first printed circuit board assembly (PCBA) located above the sensing probe, the first PCBA contained in the housing;
  a processor included on the first PCBA;

a global navigation satellite system (GNSS) module included on the first PCBA for processing a time synchronisation signal;

a power source located above the first PCBA, the power source contained in the housing;

a second PCBA located above the power source, the second PCBA contained in the housing;

wherein the top part allows a satellite communications module to be attached to the data acquisition unit, and the second PCBA permits communicative coupling between the processor and the satellite communications module.

Also disclosed herein is a server system, including:

a data communications module for receiving pre-processed ground movement data based on ground movement in a ground region sensed by each of a plurality of data acquisition units via a satellite;

a data processing module for performing ambient noise tomography to generate tomography data based on the ground-movement data; and a data visualisation module for generating a display of the ground region based on the tomography data viewable from a communicatively coupled user interface in near-real time relative to a data acquisition time of the ground movement.

Also disclosed herein is a system including the server system and one or multiple ones of the data acquisition unit as described herein.

Also disclosed herein is a method performed on a server system, including:

receiving pre-processed ground movement data based on ground movement in a ground region from each of a plurality of data acquisition units resting on the ground region via a satellite;

performing ambient noise tomography to generate tomography data based on the ground-movement data; and generating a display of the ground region based on the tomography data viewable from a communicatively coupled user interface in near-real time relative to a data acquisition time of the ground movement.

The data acquisition unit may include a communications unit and/or a satellite modem for transmitting the pre-processed data.

The processing unit may generate and store payloads containing the pre-processed ground movement data, before forwarding, at a pre-determined time, the pre-processed ground movement data to the communications unit or satellite modem for transmission.

The processing unit may generate and forward payloads containing the pre-processed ground movement data to the communications unit or satellite modem for transmission.

The data acquisition unit may include the communications module for transmitting the pre-processed data to at least one user device, base station, network node, and/or gateway device which may be in a vehicle, carried by a user, or statically deployed.

Also disclosed herein is a system including the server system and one or multiple ones of the data acquisition unit as described herein.

BRIEF DESCRIPTION OF THE DRAWINGS

FIGS. 15A, 15B, and 15C show sub-surface imaging according to some embodiments.

FIG. 16 shows sub-surface imaging according to some embodiments.

DETAILED DESCRIPTION

Figure 1:
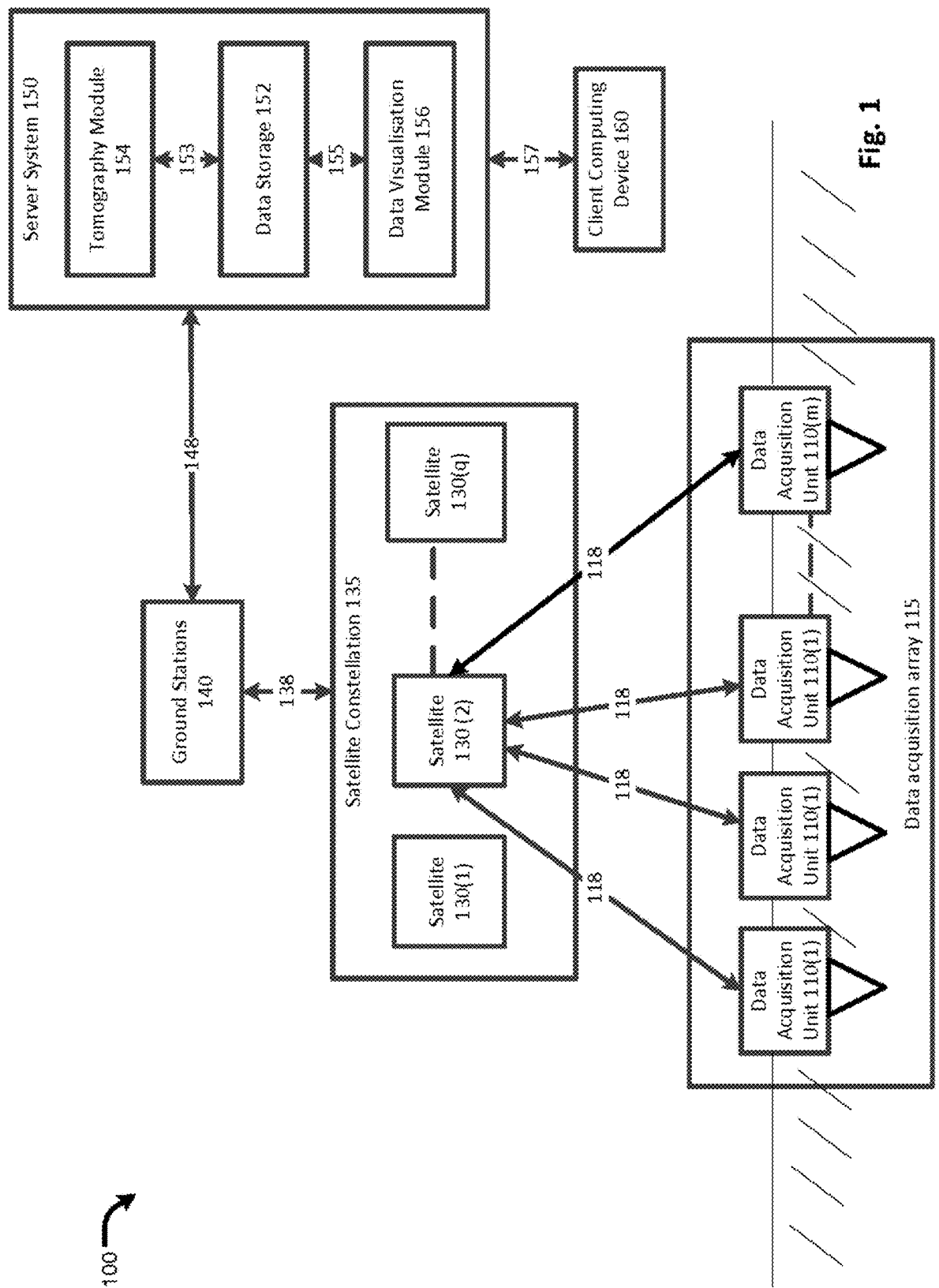
FIG. 1 is a block diagram of a remote backhaul system 100 according to some embodiments.

Embodiments relate to data acquisition units and more specifically to seismic data acquisition units for use in ambient noise tomography (ANT). Some embodiments relate to a method for data acquisition, and systems employing one or more data acquisition units. Some embodiments relate to systems comprising one or more satellites in communication with one or more data acquisition units for communication to a remote server, for remote storage and processing for creating sub-surface tomography images accessible to client devices. The sub-surface tomography images may be ambient noise tomography images created from ambient noise tomography processing.

According to some embodiments, the data acquisition units may be capable of direct radio communications with a low earth orbit (LEO) satellite network. The data acquisition units may be capable acquiring ground movement measurements, processing the measurement data, transmitting the data via the LEO satellite network to be received by a server system for ambient noise tomography processing in about 2 minutes to 2 hours depending on satellite availability, immediately after the data acquisition unit is deployed. Thus, the embodiments allow near-real time reception of data from the data acquisition units, for example for ambient noise tomography purposes. In this context of geological feature observation (i.e. long time scale as opposed to high speed computing), near-real time is intended to include periods of as low as around 1-2 minutes latency up to around 2-4 hours or 6-12 hours latency from vibration sensing to reception at the remote server. This allows images to be formed at remote client computing devices from the ambient noise tomography within a matter of days, such as around 4 days, as the received data accumulates to provide a higher and higher resolution image.

As soon as a data acquisition unit is placed, the unit can be turned on and operated so that ambient noise tomography processing can commence whilst other data acquisition units are added to the array of data acquisition units for imaging a sub-surface region according to some embodiments. The imaging and the sub-surface region which is imaged may be three dimensional (3D).

Ambient noise tomography images according to some embodiments may be available for viewing on a client device communicatively coupled to the server system within 24 hours (for low resolution) and more substantial (higher resolution) images within 4 to 5 days. The resolution and information richness of the ambient noise tomography images may be iteratively improved upon subsequent sampling and transmission of data from the data acquisition units over the sampling period of 4 to 10 days or 2 to 8 days, for example.

According to some embodiments the data acquisition units may be self-contained and include a ground sensing module, processor, memory, a power source, and an attachable satellite communications module. The data acquisition units may be able to operate and sample continuously and transmit the data for 5 to 10 days without any further (external) power source. In some embodiments, data acquisition units may sample continuously and transmit data for more than 10 days. For example, a data acquisition unit may sample continuously and transmit data for about 5 to 11 days, 5 to 12 days, 5 to 13 days, 5 to 14 days, or 5 to 15 days without any further (external) power source, for example. The power, storage, and transmission requirements of this operation may be aided by preprocessing the acquired data (to drastically compress the data by 8:1 or 16:1 or 32:1, for example) from the ground sensing module. The power source may be or include a rechargeable battery pack, for example.

According to some embodiments, the data acquisition unit measures seismic vibration in the ground region near where it is deployed. A geophone element may be used to generate electrical signals proportional to the vibrational velocity induced in the sensor. This signal is digitised and stored in a data buffer. Ambient noise tomography usually requires a continuous stream of data. In addition, only the z-axis (coaxial with the local gravity vector) may be required. The data acquisition unit may sample its single geophone every 40 milliseconds (25 Hz), for example. It may store each sample in a software buffer. This sample rate could be higher, but as will become clear, the higher the sample rate, the greater the processing capability (and non-volatile storage) needs to be. The samples buffer may be able to hold 512 samples, for example. In some other embodiments, the buffer size may be 64, 128, 256, 512, or 1024 samples. Once the current buffer is full, the buffer contents is passed down into a sequence of digital signal processing functions. Whilst this processing is happening (taking up computer resources), new samples obtained from the geophone are inserted into a second buffer. As such, between these two buffers, one will always be used for the processing algorithms and the other will be used to receive new samples.

According to some embodiments, the digital signal pre-processing composes of six stages. The fundamental purpose of these pre-processing algorithms is to condition the data for seismic analysis and reduce the data size significantly. The first stage may optionally decimate the data. The second stage de-trends or de-biases the data. This is intended to remove inherent biases in the geophone signal (such as a DC bias or temperature influence). The third pre-processing stage uses a fast Fourier transform (FFT) algorithm to convert the time-domain seismic signal into its frequency constituents. This FFT algorithm requires the data buffer size to be an exponent factor of two. With the data in the frequency domain, the signal can be filtered by applying pre-determined filter coefficients or making changes to the amplitude and frequency bins. The fourth pre-processing stage spectrally whitens the filtered data. By whitening the data, the amplitude across a frequency range can be essentially normalised with a Tukey window. The rounded edges are intended to reduce any aliasing (artefacts) when transforming the filtered data back into the time domain. The fifth pre-processing stage does this transformation by using the inverse fast Fourier transform (IFFT) algorithm. The sixth and final pre-processing stage of this processing pipeline includes one-bit normalising the data. With one-bit normalising, amplitudes that are positive are represented with a one, and conversely amplitudes that are negative are represented with a zero. Even though the amplitude information of the original seismic signal is essentially obliterated, the phase information of the signal is preserved. The phase information may be more helpful or essential than the amplitude information for processing ambient noise tomography at the server system where the data is used to generate three-dimensional subsurface models.

The one-bit normalisation may compress the data substantially, allowing the original four-byte sample (from a 32-bit analogue to digital converter) to be represented by a single bit (e.g. 32:1 compression ratio). From the perspective of a payload that can be sent from the data acquisition unit via the satellite modem, each byte will contain eight samples. In other embodiments, a lesser compression ratio, such as 8:1 or a compression ratio between 8:1 and 32:1, may be used.

The housing may be secured into the ground and radial buttresses or ribs may project from an underside of the housing (e.g., extending between the outer wall and an upper part of the sensor probe housing part) to mitigate or resist rotation of the housing or the sensing probe. The housing may have two printed circuit boards (PCBs), each mounting components of the data acquisition unit to form respective printed circuit board assemblies (PCBAs), to improve the configuration of cabling within the housing. The housing may have panels on side faces of an upper part of the housing situated to be located above an earth surface when the data acquisition unit is deployed in the earth, to improve the amount of surface area to be utilised for external facing/protruding components of the data acquisition unit. The panels may be flat to host components such as receptacles, buttons and antennas, and may form a hexagonal shape to better tessellate to panels of other data acquisition units for easy packing and charging on a charging rack. In some embodiments, at least one of the data acquisition units may be placed in a charging case for charging. The charging case can be used for transporting the at least one of the data acquisition units to or from a site before, between, or after deployments. Transport can be by a vehicle, such as a ground, air, or aquatic based transport vehicle.

FIG. 1 is a block diagram of a sub-surface tomography system 100 according to some embodiments. The sub-surface tomography system 100 may also be described as a data acquisition system 100. The sub-surface tomography system 100 comprises a data acquisition unit array 115. The data acquisition array 115 comprises one or more data acquisition units 110. The data acquisition unit 110 may also be referred to as a seismic data acquisition unit, vibration sensing apparatus, seismometer module, geophone apparatus, geologic instrument, data acquisition node, end-node, node device or a sensor node. The data acquisition unit 110 may also be referred to as "smart seismometer".

The data acquisition unit 110 may be capable of wireless communication between the seismic data acquisition unit 110 and a user device. The wireless communication between the data acquisition unit 110 and the user device may be a LPWAN communication link. For example, the communication link may be in the form of a LoRaWAN wireless link or a Narrowband Internet of Things wireless link or Sigfox LPWAN wireless link or any other wireless communication link suitable for a low-power wide-area network communication. Communication over the wireless communication link may be made resilient to interference by utilising spread spectrum techniques, such as Direct Sequence Spread Spectrum (DSSS) or Chirp Spread Spectrum (CSS), Random Phase Multiple Access (RPMA) and Listen-Before-Talk (LBT), for example. In such communication, the wireless device may act as a beacon to assist a user of the user device to locate the data acquisition unit 110. The data acquisition unit 110 may also communicate to the wireless device diagnostic information, such as whether the data acquisition unit has low battery levels, for example. The wireless communication between the data acquisition unit 110 and the user device 160 may also comprise or be performed using other protocols, such as Bluetooth Low Energy (BLE), for example.

In some embodiments, the data acquisition unit 110 comprises LPWAN antennas that are configured to communicate over 8 or 16 radio channels. The data acquisition unit 110 may communicate with a user device within a range of 20 km, for example. The LPWAN antenna of the data acquisition unit 110 may be configured to communicate using the LoRa™ technology over the frequency bands 902-928 MHZ, 863-870 MHz, 433-434 MHz, for example. The data acquisition units 110 may also be configured to communicate over Bluetooth (or other short-range) technology or over WiFi™ with devices located in its immediate vicinity, for example within a range of 15 m. In some other embodiments, at least some of the data acquisition units 110 may be configured to communicate via radio/mobile protocols defined by 3GPP, according to 3G, 4G, or 5G standards, for example. This may be helpful for implementations of sub-surface tomography system 100 using vehicular based network nodes for mobile backhaul to server system, instead of satellite communications, for example.

The sub-surface tomography system 100 also comprises a satellite constellation 135. The satellite constellation 135 comprises one or more satellites 130. Each of the one or more satellites 130 may be a Low Earth Orbit (LEO) satellite 130. In some other embodiments, one or more of satellites 130 may be a Geostationary (GEO) satellite 130. The satellite 130 is capable of communicating with data acquisition unit 110 over a communication link 118. In embodiments with more than one satellite 130, the communication link 118 may extend to the more than one satellite 130. The communication link 118 may not be a persistent communication link and if satellite 130 is not accessible to the data acquisition unit 110, the data acquisition unit 120 may await the resumption of the radio communication link 118 to continue communication of information.

Radio communication links 118 are radio links to satellites 130 orbiting the earth to communicate data acquired from the one or more data acquisition units 110 of the data acquisition array 115 and receive instructions or configuration information or firmware updates for the one or more seismic data acquisition units 110.

The sub-surface tomography system 100 also comprises one or more ground stations 140. The ground stations 140 receive communication from one or more satellites 130 of the satellite constellation 135 over a communication link 138. The communication link 138 may be facilitated by radio waves of suitable frequency according to the region where the ground station 140 is located.

The satellite 130 may be a LEO satellite that circles the earth approximately every 90-110 minutes, for example. With such orbiting satellites, a relatively smaller number of satellite ground stations 140 may be used to receive downlinks from satellite 130, or all the data transmitted by the one or more data acquisition units 110 of the data acquisition array 115.

In some embodiments, satellites 130 in a near polar orbit may be used and ground stations 140 may be located near each of the Earth's poles. This arrangement allows each satellite 130 to connect to a ground station 140 on almost every orbit, leaving the throughput latency no higher than around 45 minutes (half the time required to complete an orbit), for example. In some embodiments, ground stations may be located at lower latitudes with less harsh weather and transport, and easier access to power and communication links to the ground station 140. The ground station 140 may comprise radio communication equipment necessary to communicate with the satellite 130 and a communication interface to relay received information to a server system 150 over a communications link 148. The communication link 148 may be a wired or wireless communication link to the internet available to the ground station 140 and to the server system 150. The server system 150 may be accessible over the internet through an application or platform on a client device 160 over a conventional internet connection over the communication link 157. The communications of server system 150 may be handled by a server system communications module. The client device 160 may be an end user computing device such as a desktop, laptop, mobile device, tablet, for example.

The server system 150 may be configured to decode, decrypt and/or decompress communications originating from the data acquisition units 110 and received over the communication links 118, 138 and 148 and store any data from the communications in data storage 152. In some other embodiments, the server system 150 may receive communications originating from the data acquisition units 110 and store any data from the communications in data storage 152.

In some embodiments, server system 150 may further comprise a tomography module 154 (which includes program code) executable by a processor of the server system 150 or the tomography module 154 may be located separately and communicatively coupled to the server system 150 via link 153. Tomography module 154 may also be referred to as subsurface imaging module 154, or ambient noise tomography (ANT) module 154, for example. When executed, tomography module 154 may read data from the communications originating from the data acquisition units stored in data storage 152. The tomography module 154 may perform sub-surface tomography processing using the read data from the data storage 152. The sub-surface tomography processing may comprise ambient noise tomography processing. After performing sub-surface tomography processing, the tomography module 154 may send the sub-surface tomography data via link 153 to be stored in data storage 152. Sub-surface tomography data may be data that can be processed to generate one or more sub-surface tomography images. Sub-surface tomography data may be data that can be processed to generate one or more sub-surface tomography images, such as one or more 3-D sub-surface tomography images.

Server system 150 may comprise or have access to code for executing a data visualisation module 156. The data visualisation module 156 may be a platform accessible to client device 160. The data visualisation module 156 may read sub-surface tomography data from the data storage 152. The data visualisation module 156 and/or client device 160 may process sub-surface tomography data to generate sub-surface tomography images to be viewed on client device 160. The generated sub-surface tomography images may be ambient noise tomography images.

The sub-surface tomography system 100 enables high-latency communication of data between the data acquisition array 115 and the client device 160. High-latency communication may be inherently suitable for transmitting small messages to and from the data acquisition array 115 deployed in remote locations and the server system 150. High-latency communication may comprise latency of greater than about 1 second, 2 seconds, 15 seconds, 30 seconds, or 1, 2, 3, 4 or 5 minutes, for example. Two high-latency communication methods are store and forward communication and short burst data communication.

Store and forward communication may be implemented by the satellite constellation 135 that periodically passes into a range where communication may be received from the data acquisition units 110 positioned in a remote location. Satellite 130 may gather data from the data acquisition units 110 and deliver it back to ground stations 140 that are connected to a network backbone or a network generally accessible over the internet. In some embodiments, the store and forward communication could be implemented by satellites or any type of air, ground or sea vehicles (carrying suitable communication and storage equipment) that intermittently travel within communications range of the gateway device 120 or data acquisition unit 110. For example, alternative implementations to satellite based store and forward may include wireless communications between the data acquisition units 110 with one or more user device, base station, network node, and/or gateways. The one or more user device, base station, network node, and/or gateways may be vehicle mounted, for example in an automobile or in an aerial vehicle such as an unmanned aerial vehicle (UAV) or drone. The vehicle for vehicle mounting may be mobile piloted, semi-autonomously controlled, or autonomously controlled. At least one user device, base station, network node, and/or gateway device may be carried by a user/field operator whilst on foot or in a vehicle. In some embodiments, store and forward communications can be enabled via a communications handshake between satellite modem, processor, and/or a communications unit of data acquisition unit 110 and at least one user device, base station, network node, and/or gateway device. The transfers of data by the store and forward method may be bi-directional. The vehicles or satellites used to implement store and forward communication can be far less numerous than a number of statically deployed terrestrial devices that would be needed to cover a designated remote area. Further, vehicles or satellites used to implement store and forward communication can be more rapidly deployed, which can save time during the implementation of the sub-surface tomography system 100, reduce the duration of blackouts resulting from failure of statically deployed terrestrial devices and permit maintenance operations and system upgrades to be carried out using the server system 150 rather than on site in the field.

In some other embodiments, data acquisition units 110 are in communication with and/or within wireless communication range of at least one user device, base station, network node, and/or gateway device which is stationary. The at least one stationary user device, base station, network node, and/or gateway device may be statically deployed. Data acquisition units 110 may store and forward or transmit sampled data by other means to the at least one stationary user device, base station, network node, and/or gateway device. At least one stationary user device, base station, network node, and/or gateway device may have a satellite modem to communicate with satellite constellation 135, or may have another backhaul method available such as mobile and/or optical backhaul, for example.

Short Burst Data (SBD) is another technique for communicating short data messages between seismic data acquisition unit 110 and a centralised host computing system such as the server system 150. SBD satellite messaging systems work by waiting for a suitable slot in a satellite network that has voice as its primary application. Examples include Orbcomm™, Iridium™ and Globalstar™. The voice traffic in such systems is prioritised and requires latencies typically less than 500 ms, for example. However, due to the fluctuating demands for voice traffic, there are windows in which shorter messages can be sent. This is analogous to the Short Messaging System (SMS) technique/standard used in terrestrial communications networks design for mobile telephony. The typical latencies of the SBD traffic in such systems can be in the range of 5 seconds to 10 minutes or greater, for example.

Figure 2A:
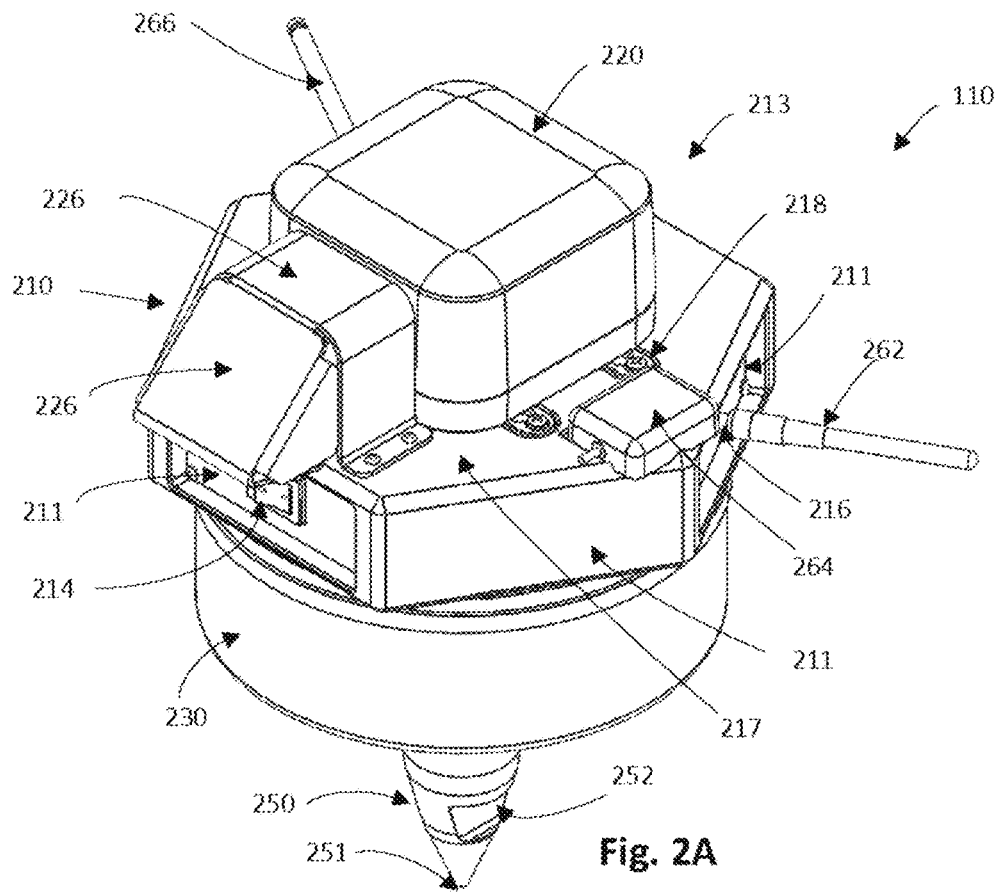
FIGS. 2A and 2B show external isometric views of data acquisition unit according to some embodiments.
Figure 2B:
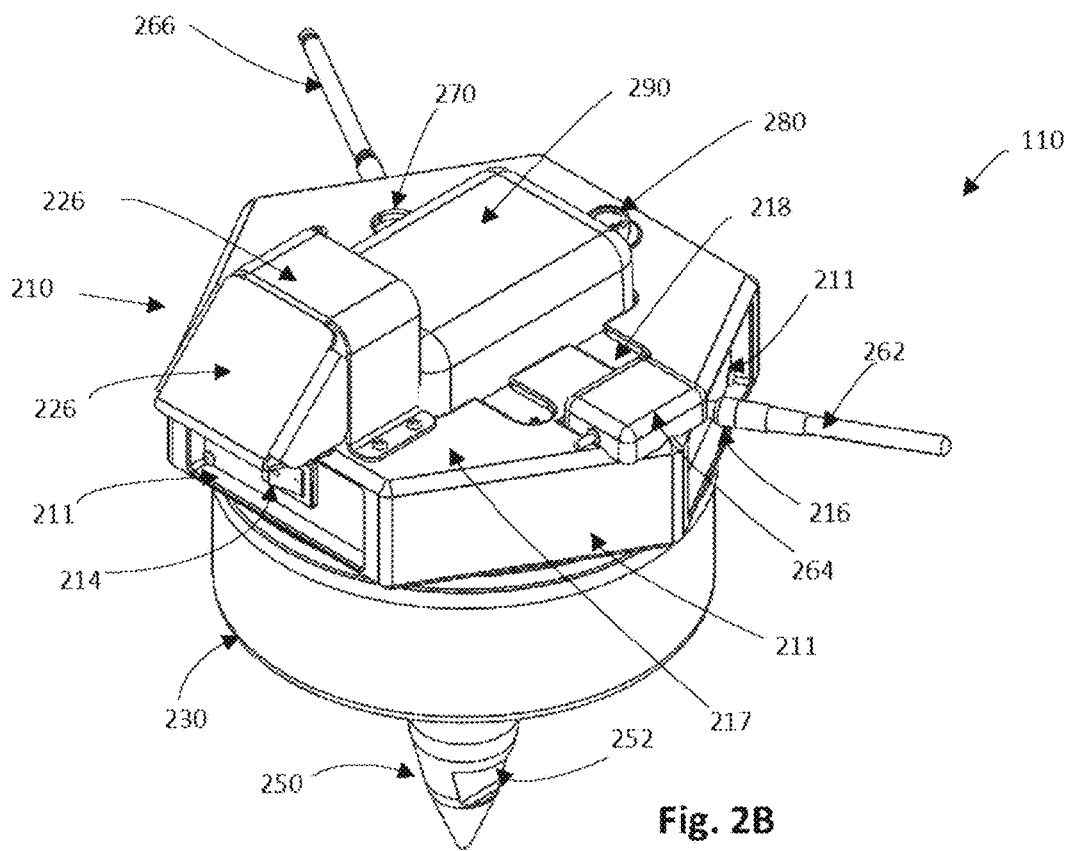
Figure 3:
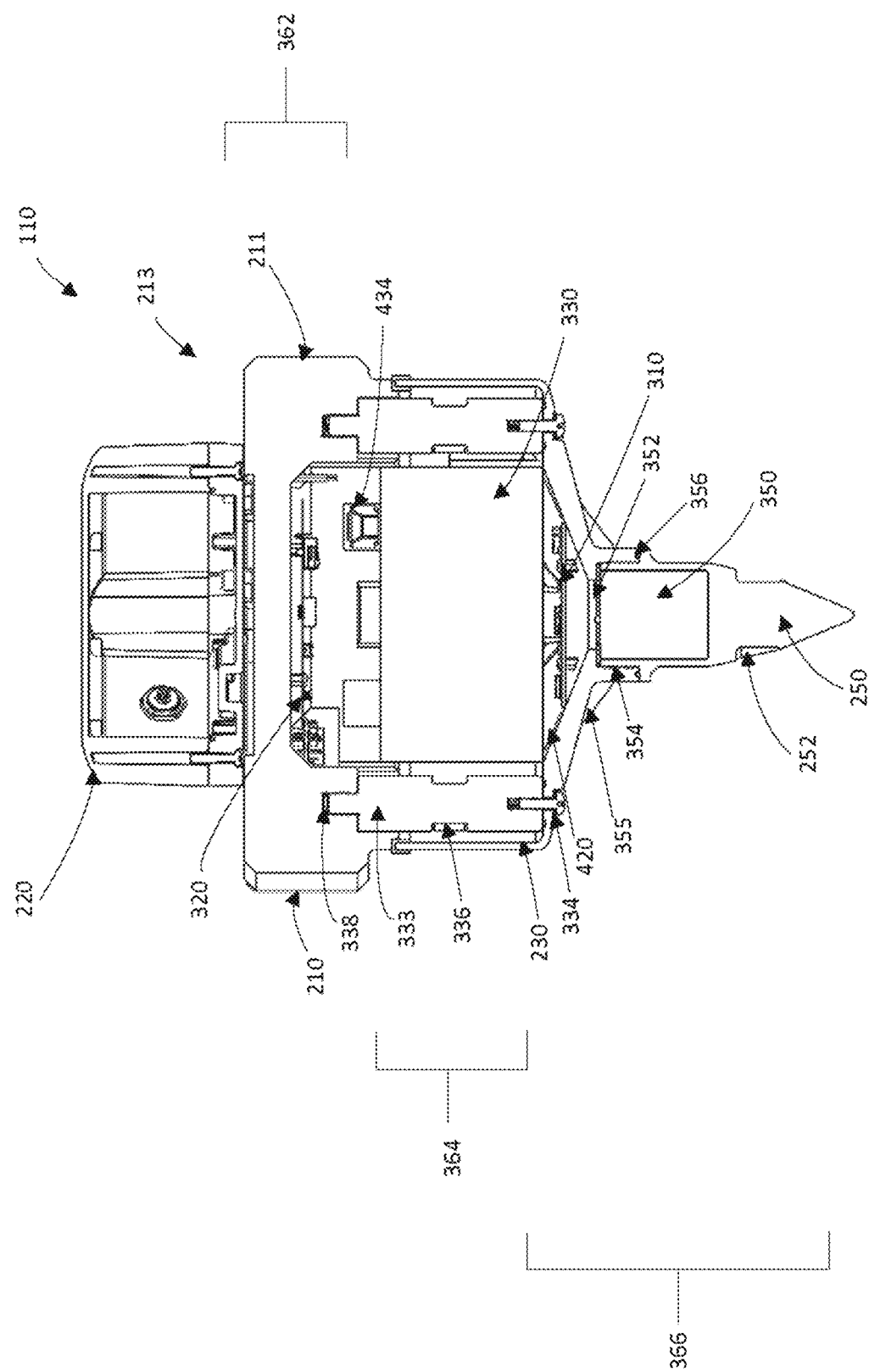
FIG. 3 shows a cross-sectional view of data acquisition unit according to some embodiments.

FIGS. 2A and 2B show external views of seismic data acquisition unit 110 according to some embodiments. The data acquisition unit 110 may comprise a data acquisition device 213 in combination with a satellite modem 220, as also shown in FIG. 3. The data acquisition device 213 may comprise closed housing 205. Closed housing 205 may comprise an upper part 210 and a bottom part 230. The upper part 210 and the bottom part 230 are configured to mate and seal with each other (with suitable sealing material) to form a substantially closed and sealed internal chamber. The seal may prevent soil and/or moisture such as water, ingress into the chamber. Upper part 210 may be formed of aluminum or another light but strong metal or material, for example. Bottom part 230 may be formed of aluminum or another light but strong metal or material, for example. Bottom part 230 may comprise a vibration sensing portion 250, removably or irremovably coupled to and/or extending from the bottom part 230. Vibration sensing portion 250 may be referred to as sensing probe 250 or spike 250. Vibration sensing portion 250 includes a narrowing (generally conical) distal tip 251 at a lower extremity of the vibration sensing portion 250.

Vibration sensing portion 250 may be formed of stainless steel or another suitably hard metal for effectively transmitting externally originating vibrations to a vibration transducer housed in and/or in mechanical communication with the sensing portion 250.

Figure 22:
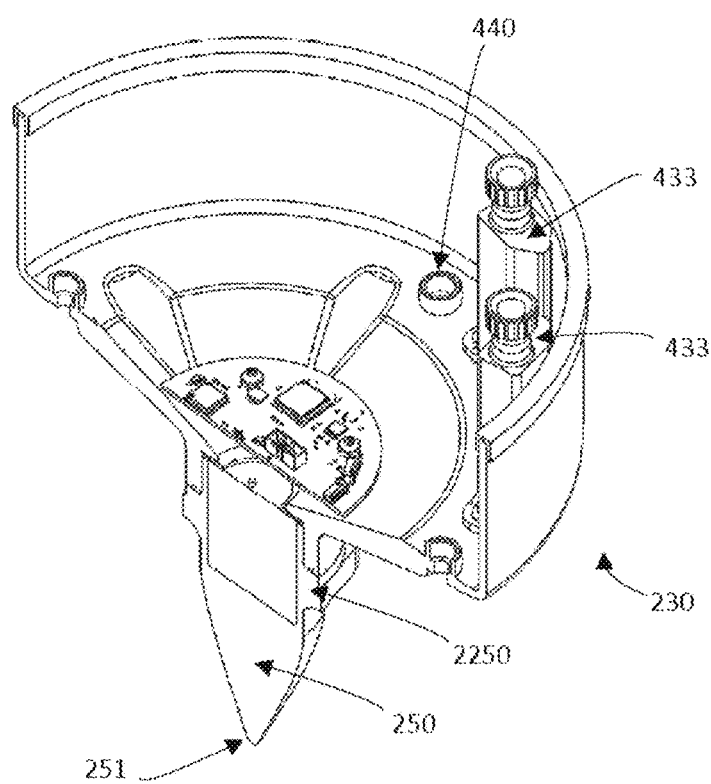
FIG. 22 shows a cross-sectional view of the bottom part of the data acquisition unit according to some other embodiments.

Vibration sensing portion 250 may comprise one or more probe recesses 252. The one or more probe recesses 252 may be shaped to provide a surface to engage with a tool, such as a spanner, to assist coupling vibration sensing portion 250 to an underside surface of bottom part 230. In some other embodiments, as shown in FIG. 22, vibration sensing portion 250 does not include one or more probe recess 252. In some other embodiments, as shown in FIG. 22, vibration sensing portion 250 includes an engagement projection 2250 around the vibration sensing portion 250. Engagement projection 2250 may engage with a tool, such as a spanner to assist coupling vibration sensing portion 250 to an underside surface of bottom part 230. The engagement projection 2250 may have engagement lands, such as flat faces, for example in the approximate shape of a hexagon or square. The engagement projection 2250 may be located proximate to the bottom part 230. In such embodiments, the sensing portion 250 is provided with a more uniformly tapering cross-section between the mid-section of the sensing portion 250 and the distal tip 251. This provides improved penetrability and strength of sensing portion 250.

Upper part 210 may comprise a top surface 217. Top surface 217 may be an exterior surface of the upper part 210.

Upper part 210 may comprise a side circumference as long or longer than the side circumference of bottom part 230. Upper part 210 may comprise flat side panels 211. Flat side panels may be connected around the sides of the upper part 210 to form a hexagonal shape. The hexagonal shape of the upper part 210 may be useful for tessellating the data acquisition device 213 with other data acquisition devices 213 when transporting or charging together, when on a charging rack for example. In some embodiments, the data acquisition units 110 may be placed in a charging case for charging. The charging case can be used to transport the data acquisition units 110 in the field and for road/air freight.

Data acquisition device 213 may comprise a power switch 214. The power switch 214 may be located on a side panel 211. The power switch 214 may be communicatively coupled to a power source, which powers the data acquisition device 213. Power switch when actioned may allow data acquisition device 213 to be activated without the need to open or disassemble data acquisition device 213.

Data acquisition device 213 may comprise a passive global navigation satellite system (GNSS) antenna 262. Passive GNSS antenna 262 may extend from a side panel 211, for example. Passive GNSS antenna 262 may extend from a connection jack on side panel 211, for example. Passive GNSS antenna 262 may be connected to the data acquisition device 213 from connector 216. Passive GNSS antenna 262 may be assisted by an inbuilt low noise gain (LNA) on a PCBA within the data acquisition device 213, for example. Passive GNSS antenna 262 may have less power consumption than an active antenna. Passive GNSS antenna 262 may be an antenna for receiving global positioning system (GPS), GLONASS, Beidou, or Galileo signals, for example.

Data acquisition device 213 may comprise a communications antenna 266. Communications antenna 266 may extend from a side panel 211. Communications antenna 266 may extend from a connection jack on side panel 211. Communications antenna 266 may extend from a side panel 211 which is not adjacent to the side panel 211 which the passive GNSS antenna extends from. Communications antenna 266 may be a WAN communications antenna. Communications antenna 266 may be a LPWAN communications antenna in some embodiments. The data acquisition device 213 is intended to be installed or positioned in the ground so that the side panels 211 and the associated peripherals (e.g. antennas, ports, switches) are above a soil surface, while the rest of the housing 205 below the side panels 211 is submerged in the soil.

Data acquisition device 213 may comprise an active GNSS antenna 264. Active GNSS antenna 264 may be coupled to the top surface 217. Top surface 217 may have a recess to partially receive the active GNSS antenna 264. Active GNSS antenna 264 may be an antenna for receiving GPS, GLONASS, Beidou, or Galileo signals, for example. Data acquisition device 213 may comprise a modem cap 220 as shown in FIG. 2a. Modem cap 220 may be an injection molded polymer.

Data acquisition unit 110 may include a satellite modem 290. Satellite modem 290 may be referred to as satellite communications module 290. Satellite modem 290 may be a modem for communicating with one or more satellites 130 from satellite constellation 135. Satellite modem 290 may include an inbuilt-antenna. Satellite modem 290 may be an Orbcomm, Iridium, Fleet Space, Inmarsat, or Gilat modem, for example.

Modem cap 220 may shield the satellite modem 290 from weather or debris, for example. Modem cap 220 may shield the satellite modem 290 without affecting or only slightly affecting the antenna performance of modem 290.

Data acquisition device 213 may include a satellite modem receiving recess 218, for receiving the satellite modem 290. The satellite modem receiving recess 218 may be located on top surface 217. The satellite modem receiving recess 218 may have screw holes or other attachment features for securing satellite modem 290 to the top of the data acquisition device 213.

Data acquisition device 213 may also include one or more protection plates 226. One or more protection plates 226 may also be referred to as modem cable protection plate 226. The one or more protection plates 226 may be configured to protect cables extending from a port of the satellite modem 290 and/or the modem cap into a port or recess in top surface 217 or a side panel 211. The one or more protection plates 226 may prevent weather damage or tampering with the cables enclosed. The one or more protection plates 226 may be positioned on or near a top edge portion of the upper part 210, as shown in FIGS. 2A and 2B.

Data acquisition device 213 may include a level indicator 280. Level indicator 280 may be a spirit or bubble level indicator. Level indicator 280 may be a bulls-eye indicator. Level indicator 280 may assist with orienting the data acquisition device 213 when deploying or physically manipulating the device, particularly for the alignment of vibration transducer 350 with local gravity vector.

Data acquisition device 213 may include a light emitting diode (LED) indicator 270. LED indicator 270 may illuminate, dim, and/or turn off to indicate warnings concerning battery level, for example. LED indicator 270 may illuminate different colors such as green, amber, or red, for example.

Figure 18A:
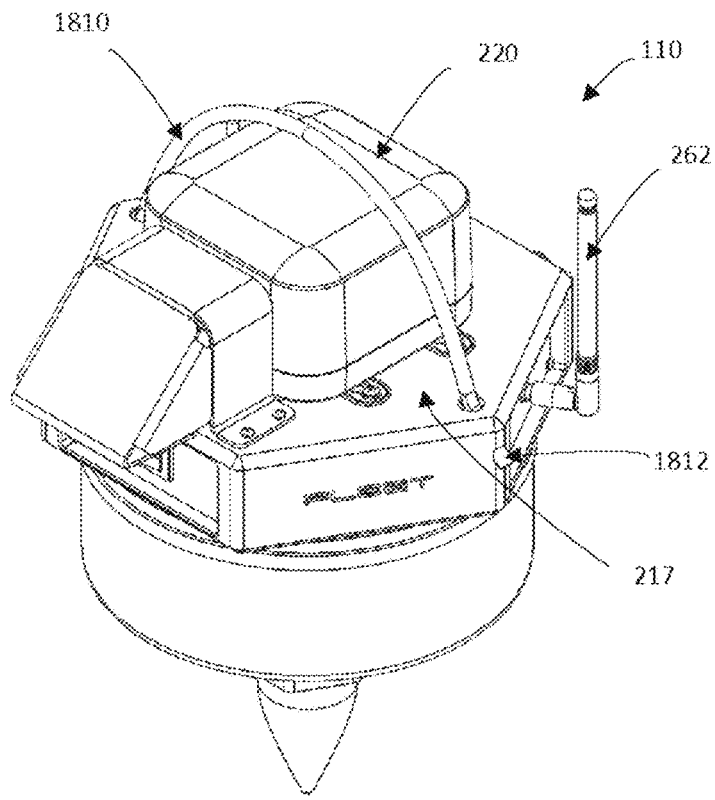
FIGS. 18A and 18B show external isometric views of data acquisition unit according to some other embodiments.
Figure 18B:
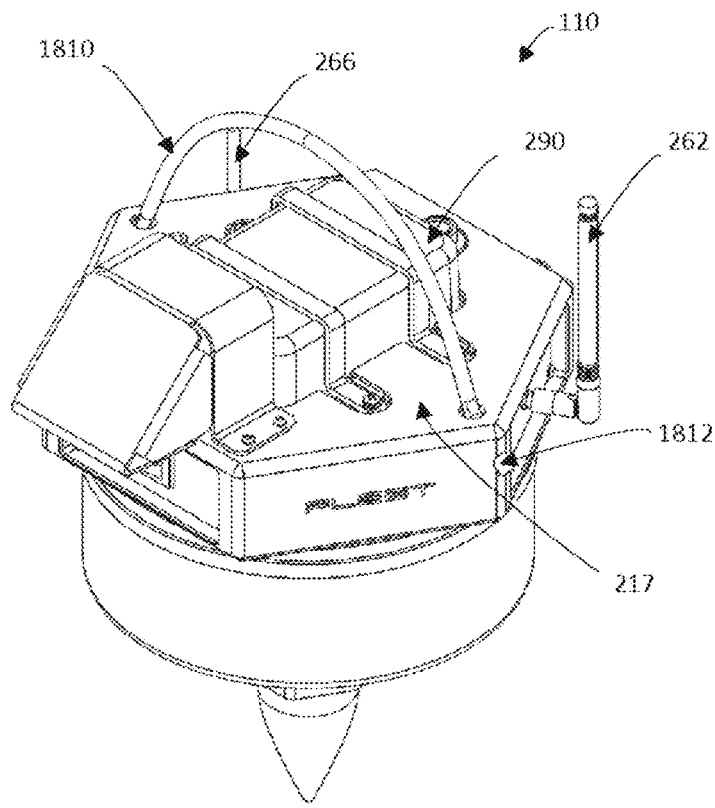

FIGS. 18A and 18B show perspective views of data acquisition unit 110 according to some other embodiments.

According to some other embodiments, data acquisition unit 110 may include a handle 1810 connectable to or through one or more portions of the top surface of upper part 217. In some embodiments, as shown in FIGS. 18A and 18B, handle 1810 is fed through two inlets on of upper part 217. Handle ends 1812 of handle 1810 may be tied with respective knots to secure handle 1810 to data acquisition unit 110. Handle 1810 may assist a user/field operator to carry data acquisition unit 110. Handle 1810 may assist a user/field operator to extract the data acquisition unit 110 from the earth after deployment.

According to some other embodiments, data acquisition unit 110 may not include an active GNSS antenna 264, but instead include a passive GNSS antenna 262. According to some other embodiments, data acquisition unit 110 may also include communications antenna 266.

FIG. 3 shows a cross-sectional view of data acquisition unit 110 according to some embodiments.

The data acquisition device 213 may include a top portion 362, a central portion 364, and a lower portion 366 as shown in FIG. 3.

The top portion 362 may include a peripheral PCB 320. Peripheral PCB 320 may also be referred to as PCBA 320. The peripheral PCB 320 may have one or more ports to communicatively couple to a satellite modem 290. All or much of the upper part 210 may be included in the top portion 362. Satellite modem 290 may be positioned on top of the top portion 362.

The bottom portion 366 may include a vibration transducer 350. Vibration transducer 350 may also be referred to as geophone 350, ground movement sensing module 350, ground movement data acquisition mechanism 350, or ground sensing module 350. The vibration transducer 350 may be in the closed housing 205. The vibration transducer 350 may be in the closed housing 205 by being received in the vibration sensing portion 250.

Vibration sensing module 350 may be or include a single geophone. Vibration sensing module 350 may be arranged to act as a vertical axis geophone element. The geophone may have a natural frequency between about 1 to 10 Hz. The geophone may have a natural frequency between about 1 to 3 Hz, 1 to 5 Hz, or 2 to 8 Hz, for example. The geophone may have a natural frequency of about 1, 1.25, 1.5, 1.75, 2, 2.25, 2.5, 3, 3.5, 4, 4.5, 5, 6, 7, 8, 9, or 10 Hz for example. The geophone may have a sensitivity of about 100 to 300 V(m/s). The geophone may have a sensitivity of about 180 to 260 V(m/s), 200 to 280 V(m/s), or 240 to 300 V(m/s), for example. The geophone may have a sensitivity of about 120, 140, 160, 180, 200, 220, 240, 260, 280, or 300 V(m/s), for example. The geophone may be Seis Tech ST-2A, for example.

Figure 7:
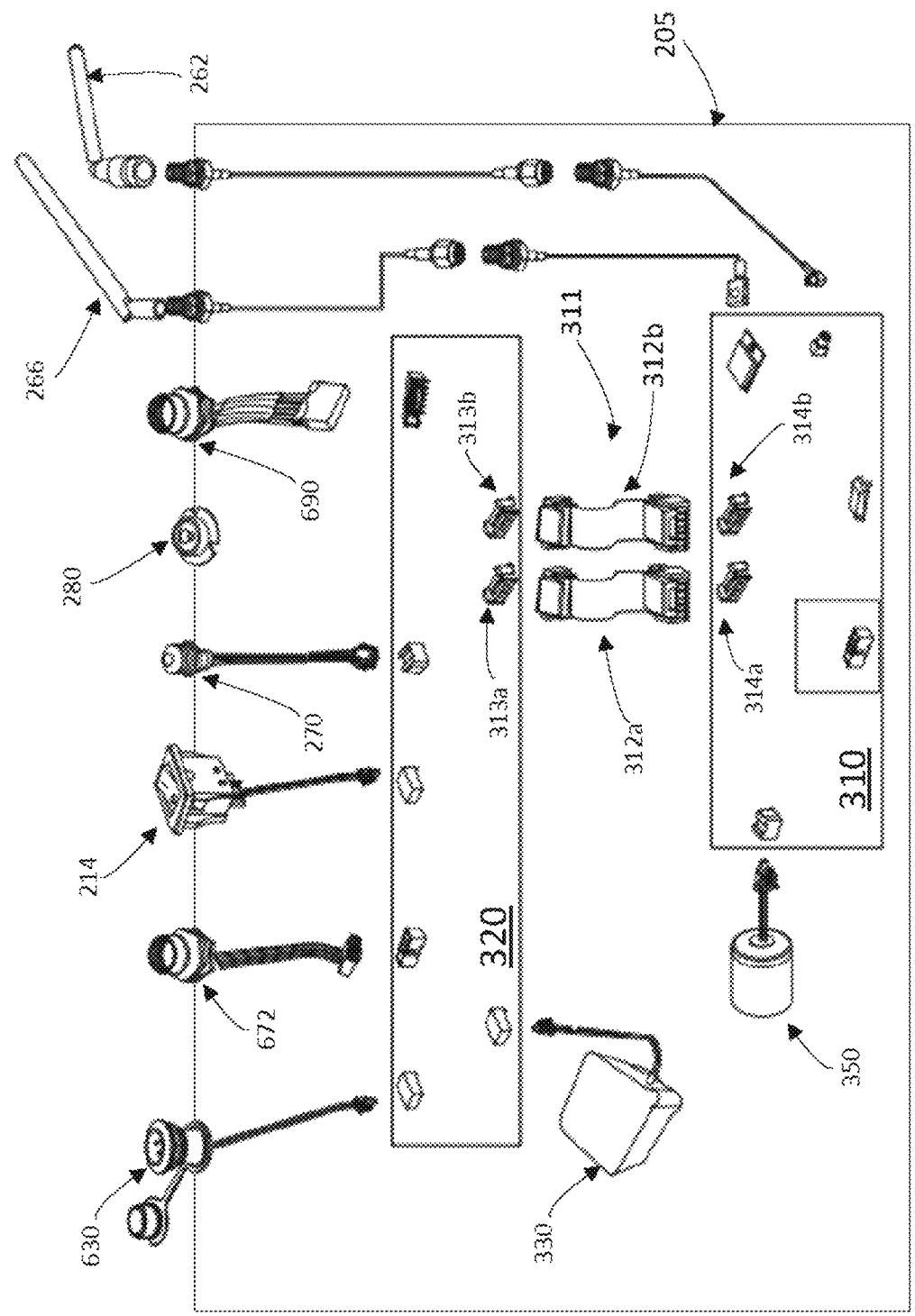
FIG. 7 shows components of the data acquisition unit according to some embodiments.
Figure 9:
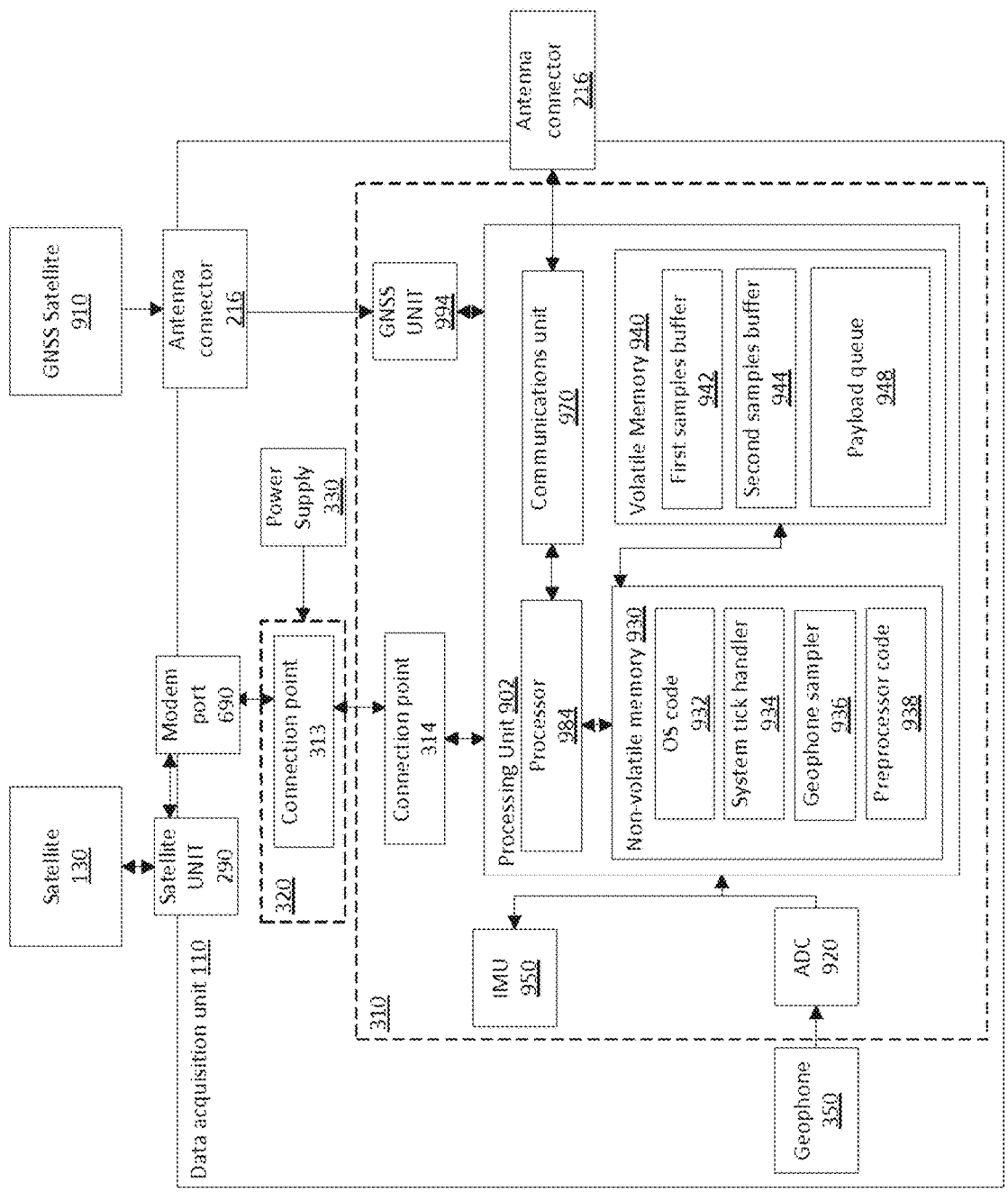
FIG. 9 is an example block diagram of a data acquisition unit according to some embodiments.

The bottom portion 366 may include a PCB 310. PCB 310 may also be referred to as PCBA 310, or Geologic Instrument PCBA 310. PCB 310 may include a processing unit 902. The processing unit 902 may include a processor 984, non-volatile memory 930, and volatile memory 940 mounted thereon. PCB 310 may also include a global navigation satellite system (GNSS) unit 994. GNSS unit 994 may also be referred to as GNSS module 994. PCB 310 may include an analogue to digital (ADC) converter 920 and an inertial measurement unit (IMU) 950. As shown in FIGS. 7 and 9, PCB 310 may be communicatively coupled to peripheral PCB 320.

The bottom portion 366 may include a probe gasket 352. Probe gasket 352 may be formed of synthetic rubber, for example. Probe gasket 352 may form a compressible blocking above the vibration transducer 350 and below a surface of the bottom part 230. The probe gasket 352 may be neoprene. The probe gasket 352 may be circular and/or annular. The probe gasket 352 may be coupled to vibration transducer 350. The probe gasket 352 may have a recess for allowing cabled connections from ground sensing module 350 to PCB 310 and/or processor 984 to communicatively couple ground sensing module 350 to processor 984 and/or other components on PCB 310, such as analog to digital converter 920 or memory 940.

The bottom portion 366 may include a probe receiving recess 354. Probe receiving recess 354 may be a recess in bottom part 230 which is formed to receive a portion of sensing probe 250. The probe receiving recess 354 and the portion of the sensing probe 250 which is received may each include threads to threadedly engage with one another to secure sensing probe 250 to bottom part 230.

The central portion 364 may include a power source 330 disposed in the internal chamber defined by the upper part 210 and the bottom part 230. The data acquisition unit 110 may include a power supply. The power supply may include power supply circuitry and/or connections on/to components on PCBA 310 and/or PCBA 320. The power supply may include power source 330. The power supply may supply power from power source 330 to components of data acquisition unit 110 via circuitry and/or connections to components on PCBA 310 and/or PCBA 320, such as processor 984. The power supply may include a voltage/power regulator. Power source 330 may also be referred to as power supply 330 or battery pack 330. The power source 330 may be or include a battery pack. The power source 330 may comprise one or more battery cells. The one or more battery cells may be slightly smaller than double A, for example. The one or more battery cells may be sized according to battery identification numbers 18650, 20700, 21700, or 38120, for example. The power source 330 may be or include at least one lithium ion (Li-Ion) battery, for example. The power source 330 is rechargeable via charging port 630.

The central portion 364 may include or house one or more integration columns 333. The one or more integration columns 333 may each be connected in a respective column receiving recess 338 on the underside of the upper part 210. The one or more integration columns 333 may be threadedly engaged with their respective column receiving recesses 338.

Upper part 210 may comprise one or more integration columns 333. The one or more integration columns 333 may extend from an underside of the upper part 210. The one or more integration columns 333 may be engaged to bottom part 230 to assist sealing the housing 205. The one or more integration columns 333 may be secured to bottom part 230 by one or more housing screws 334. Each of the one or more housing screws 334 may be received through a respective underside portion or aperture (defined by a mounting portion 440) of the bottom part 230. The one or more integration columns 333 may be engaged to bottom part 230 to assist sealing the housing 205. Upper part 210 may comprise one, two, three, four, five, six, seven, or eight integration columns 333, for example. Upper part 210 may comprise four integration columns 333. Each integration column 333 may include one or more tool recesses 336 for engaging with a tool, such as a spanner, in order to fit (e.g. by threaded engagement) each integration column 333 in a respective column receiving recess 338 on the underside of the upper part 210. Each integration column 333 and respective column receiving recess 338 may have threaded portions to engage with each other for fitting each integration column 333 in respective column receiving recess 338.

Figure 4:
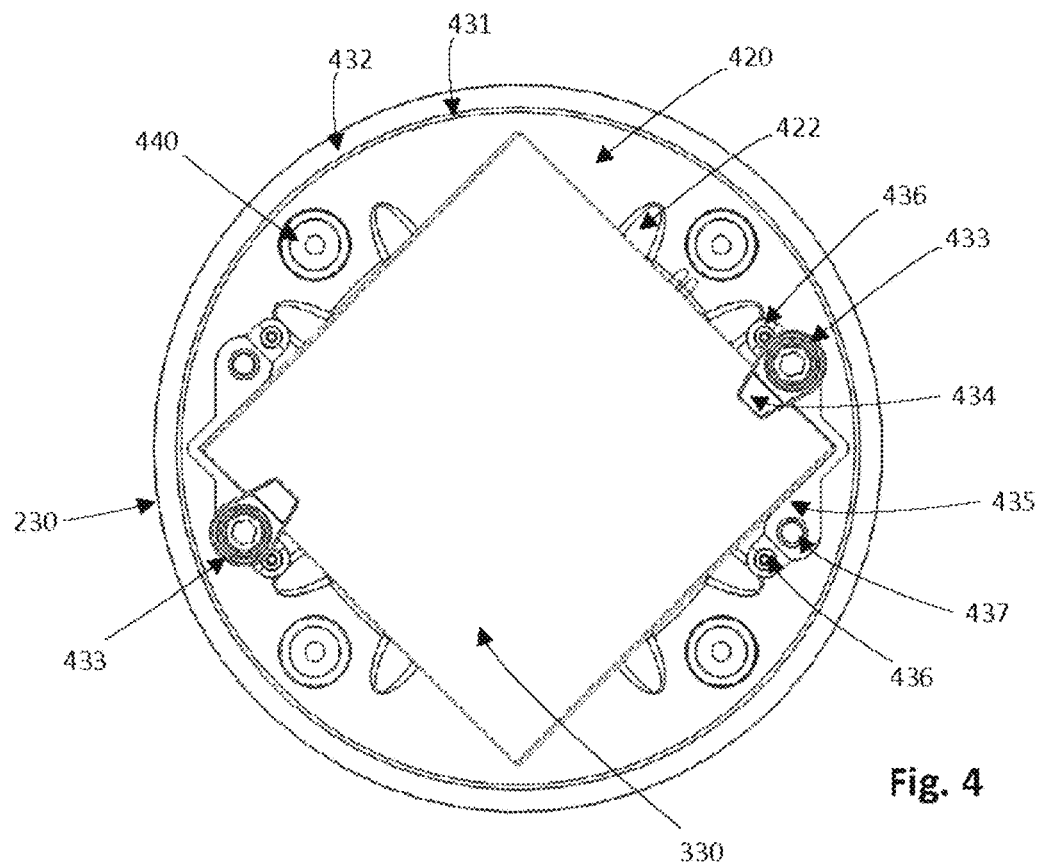
FIG. 4 shows a cross-sectional view of data acquisition unit from above according to some embodiments.
Figure 5:
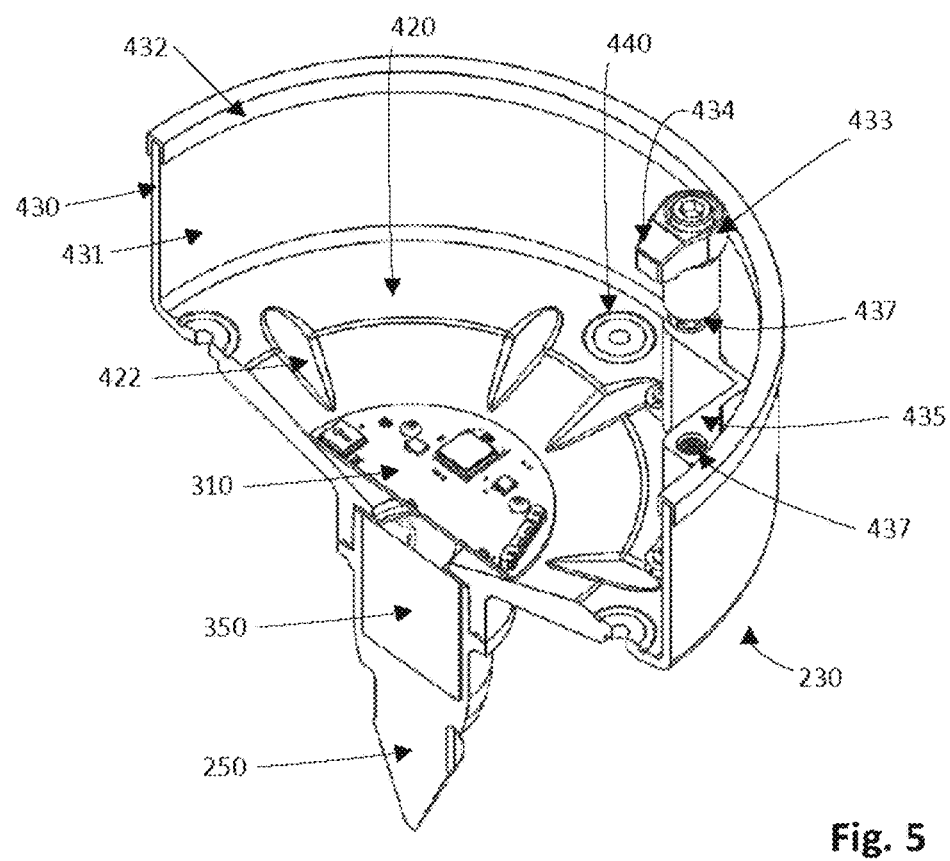
FIG. 5 shows a cross-sectional view of a bottom part of the data acquisition unit according to some embodiments.

FIG. 4 shows a cross-sectional view of data acquisition unit 110 from above according to some embodiments while FIG. 5 shows a cross-sectional view of the bottom part 230 of the data acquisition unit 110 according to some embodiments.

Bottom part 230 may comprise an internal floor 420 which faces the interior of the housing 205, as shown in FIGS. 3, 4 and 5. Bottom portion 366 may comprise internal floor 420 as shown in FIG. 3. Internal floor 420 may have an inner upwardly expanding cone or frustum shape, outwardly bordered by a flat annular portion. The space defined by the inner cone or frustum shape of internal floor 420 may receive PCB 310, as shown in FIG. 5. PCB 310 may be round shaped or circular.

When printed circuit board 310 is received in the space defined by the inner cone or frustum shape of internal floor 420, there may be a remaining space or chamber underneath the printed circuit board 310 and between the printed circuit board 310 and the internal floor 420, synthetic rubber 352 and/or ground sensing module 350 as shown in FIGS. 3 and 5.

When printed circuit board 310 is received by the inner cone or frustum shape of internal floor 420, there may be space or chamber above the printed circuit board 310 and between the printed circuit board 310 and the power source 330 as shown in FIG. 3.

Bottom part 230 may comprise an enclosed wall 430. Enclosed wall 430 may be cylindrically shaped. Enclosed wall 430 may be connected to a circumference of internal floor 420. Enclosed wall 430 may be connected to a circumference of the annular portion of the internal floor 420.

The bottom part 230 may comprise one or more column mounting portions 440. Each of the one or more column mounting portions 440 may be located on a respective portion of the internal floor 420 of the bottom part 230. The column mounting portions 440 may be shaped to receive both an integration column 333 and a housing screw 334. Bottom part 230 may comprise one, two, three, four, five, six, seven, or eight column mounting portions 440, for example. Column mounting portions 440 may each comprise one or more circular or annular recess. Column mounting portions 440 may each comprise an O-ring. According to some other embodiments, the integration columns 333 themselves may contain one or more recess housing an O-ring at the column's 333 distal surface, while column mounting portion 440 may protrude from the underside of the bottom part 230 to engage with the one or more recess and O-ring. The protruding column mounting portion 440 can be seen in FIG. 22.

Upper part 210 may comprise four integration columns 333, each column having its own housing screw 334, column receiving recess 338, column mounting point, and one or more tool recess 336.

Integration columns 333 may be cylindrically shaped. Integration columns 333 may be cylindrically shaped and perforated with one or more tool recess 336. Bottom part 230 may comprise or define one or more cable recess 422 as shown in FIGS. 4 and 5. Each of the one or more cable recess 422 may be located on or defined by a respective portion of the internal floor 420 of the bottom part 230. Cable recess 422 may be a recess which extends radially between a circumference of printed circuit board 310 and a connection region between the internal floor 420 and inner wall 430. In some embodiments, bottom part 230 comprises 1 to 12 cable recesses 422. In some embodiments, bottom part 230 comprises 2 to 6, 4 to 10, or 6 to 12 cable recesses 422. In some embodiments, bottom part 230 comprises 2, 3, 4, 5, 6, 7, 8, 9, 10, 11, or 12 cable recesses 422. As shown in FIG. 4, bottom part 230 may comprise 8 cable recesses 422. Cable recesses 422 may guide and/or partially house cables connecting to printed circuit board 310, ground sensing unit 350, and/or components on printed circuit board 310 to pass under and around power source 330 to peripheral printed circuit board 320 and/or other components or connectors of data acquisition unit 110.

Data acquisition device 213 may comprise one or more clamp structures 433, as shown in FIGS. 4 and 5. The one or more power clamp structures 433 may be configured to hold power source 430 to bottom part 230 and to hold it securely within the housing 205. The one or more clamp structures 433 may be configured to hold power source 330 to the internal floor 420 of bottom part 230. The one or more clamp structures 433 may be coupled to and/or extend from internal floor 420 and/or bottom part 230. Data acquisition device 213 may comprise one, two, three, four, five, six or seven power clamp structures 433. In some embodiments, as shown in FIG. 4, data acquisition device 213 comprises two clamp structures 433.

The one or more clamp structures 433 may comprise a power source clamp 434. The power source clamp 434 may be an uppermost portion of a clamp structure 433. The power source clamp 434 may be configured to hold power source 330 to bottom part 230. Power source clamp 434 may be adjusted vertically and/or rotated to permit the placement/removal of power source 330 and subsequent clamping of power source 430 to bottom part 230.

The one or more clamp structures 433 may also comprise a power source positioning bracket 435. The power source positioning bracket 435 may be a bracket and/or structure with a recess which can receive power source 330. The power source positioning bracket 435 may be shaped to receive power source 330, for example. As shown in FIG. 4, the power source positioning bracket 435 may be shaped to receive a portion of a side edge and portions of adjacent faces of a cuboid shaped power source 330. As shown in FIG. 4, there may be two oppositely positioned clamp structures 433, each with a power source positioning bracket 435 wherein the power source positioning brackets 435 receive opposite edges of power source 330. The two power source positioning brackets 435 may serve to prevent power source 330 from moving when vibrations occur, for example.

The one or more clamp structures 433 may also comprise one or more clamp screw recesses 436. The one or more clamp screw recesses 436 may provide a recess for inserting one or more screws to secure power clamp structure 433 to internal floor 420 and/or bottom part 230. Power clamp structures 433 may comprise one, two, three or four clamp screw recesses. In some embodiments, as shown in FIG. 4, power clamp structure 433 may comprise two clamp screw recesses 436.

The one or more clamp structures 433 may also comprise one or more clamp hole 437. Clamp hole 437 may be a recess which may receive a power source clamp 434. Power source clamp 434 as shown in FIG. 5 is shown to be already secured in a clamp hole, and another clamp hole 437 is visible and unoccupied on the same power clamp structure 433. Power source clamp 434 and clamp hole 437 may each include threads to threadedly engage with one another.

Figure 21:
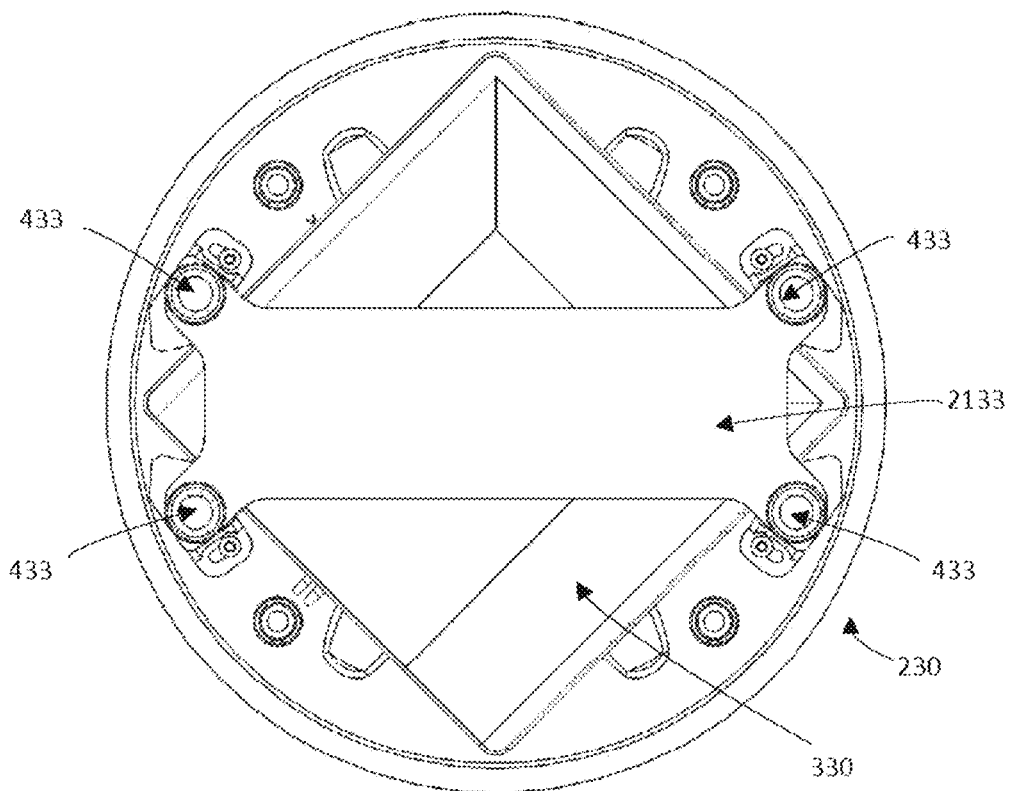
FIG. 21 shows a cross-sectional view of data acquisition unit from above according to some other embodiments.

FIGS. 21 and 22 show power clamp structure 433 according to some other embodiments, wherein each power clamp structure 433 does not include a bracket. In some other embodiments, the power clamp structures 433 can clamp a clamping sheet 2133 over power source 330, when power source 330 is positioned within the housing 205. The clamping sheet 2133 may be of a soft but durable material, such as a propylene diene monomer (EPDM), rubber, Neoprene, or polyethylene material, of suitable thickness and mass. The clamping sheet 2133 and power clamp structure are arranged so as not to put potentially damaging pressure on the top surface or mounting surfaces of the power source 330 and the printed circuit board assembly 320.

Figure 6A:
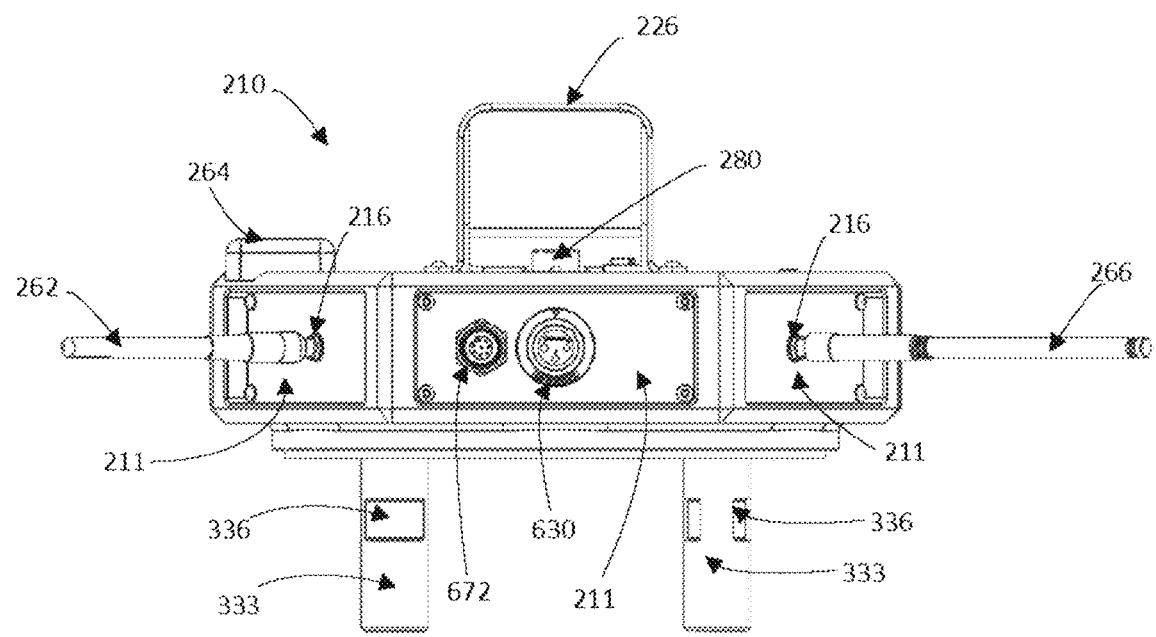
FIGS. 6A and 6B show external views of the upper part of data acquisition unit according to some embodiments.
Figure 6B:
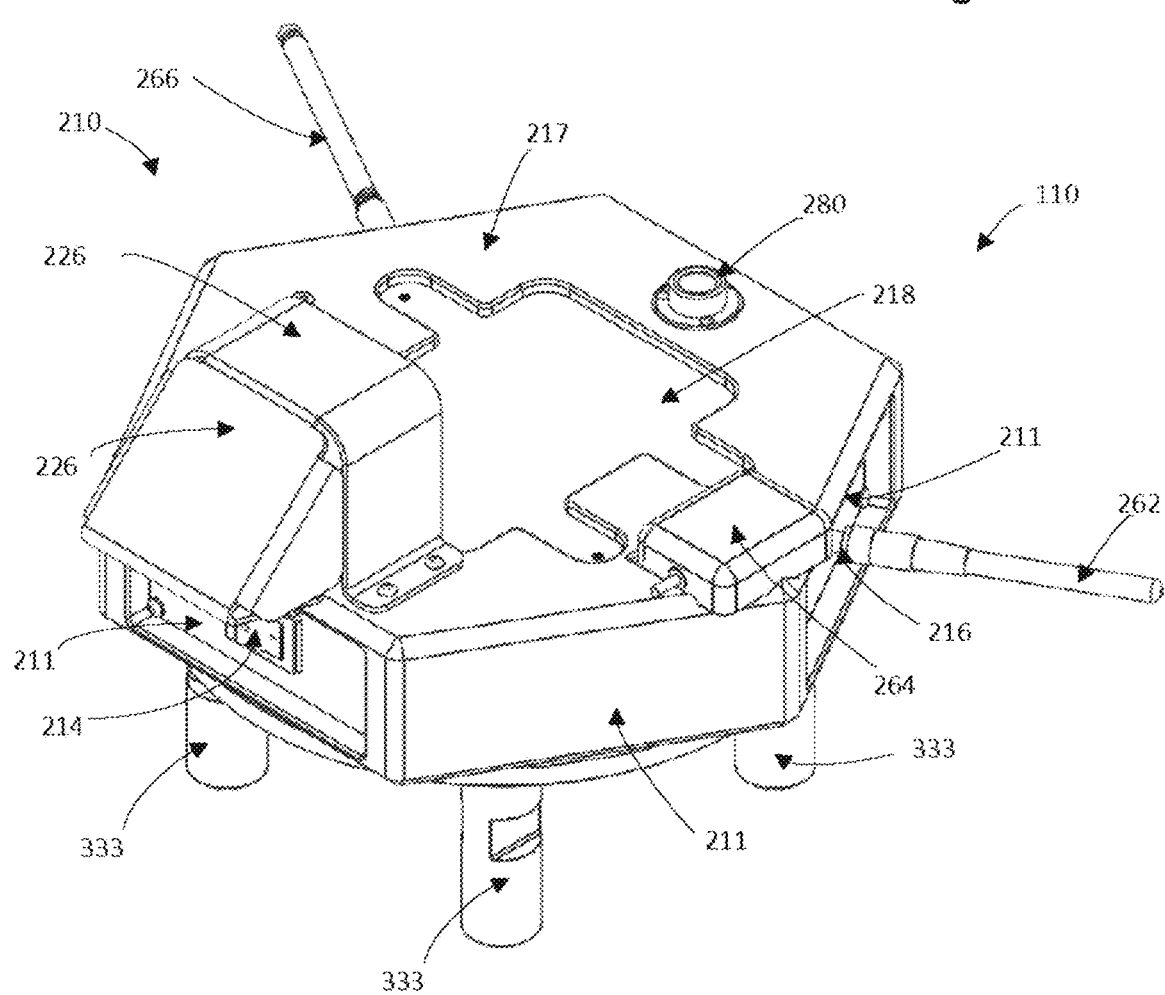

FIGS. 6A and 6B show external views of the upper part 210 of data acquisition unit 110 according to some embodiments.

Upper part 210 may comprise a charge port 630, as shown in FIG. 6*a*. Charge port 630 may be connected or connectable to power source 330. External power sources may connect to charge port 630 in order to charge power source 330.

Upper part 210 may comprise a debugging port 672. Debugging port 672 may be communicatively coupled to one or more components on peripheral printed circuit board 320 and/or printed circuit board 310. Debugging port 672 may be communicatively coupled to processor 984.

FIG. 6B shows an external view of upper part 210 and the modem receiving feature 218, which may be formed as a shallow recess, according to some embodiments. The modem receiving feature 218 may be shaped to receive a variety of modems. Referring to FIG. 6B, the modem receiving feature 218 can be visibly shown in the middle of top surface 217 of upper part 210. However, in some embodiments, the modem receiving feature 218 may extend to edges of top surface 217, for example as an inlet underneath protection plate 226, to channel rainwater accumulation from top modem receiving feature 218.

Figure 6C:
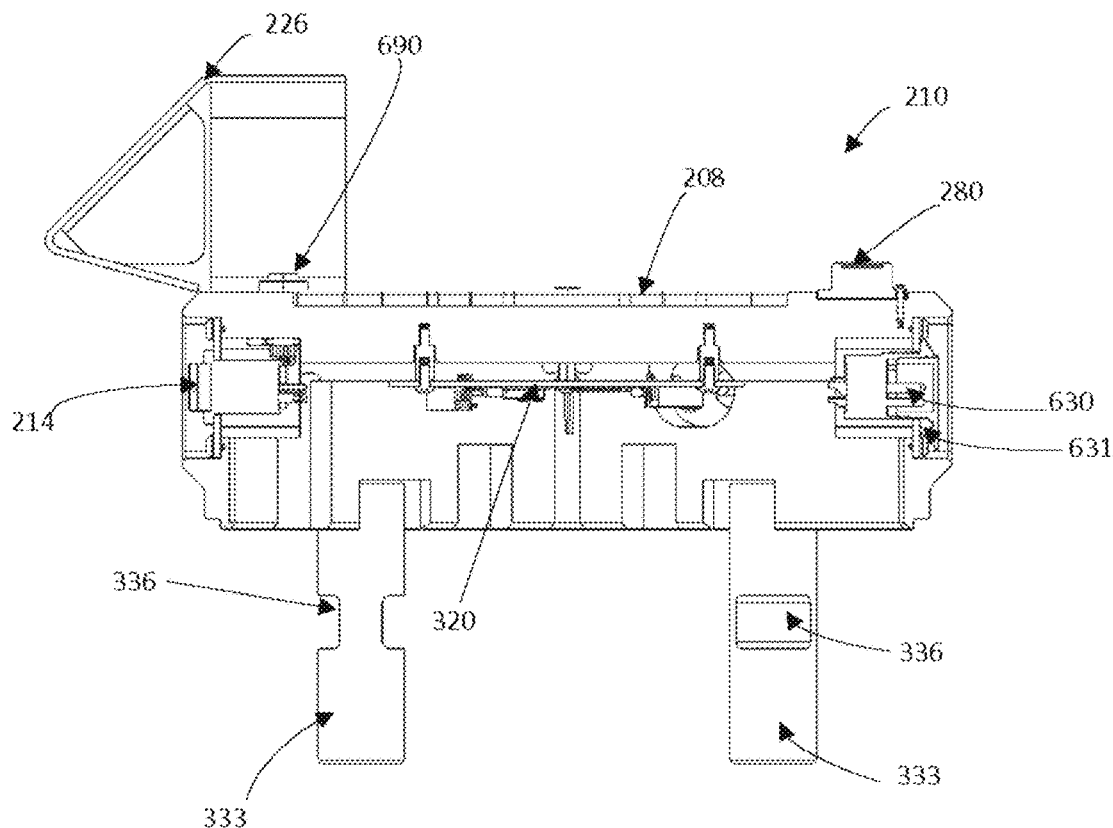
FIGS. 6C and 6D show cross-sectional views of the upper part of data acquisition unit according to some embodiments.
Figure 6D:
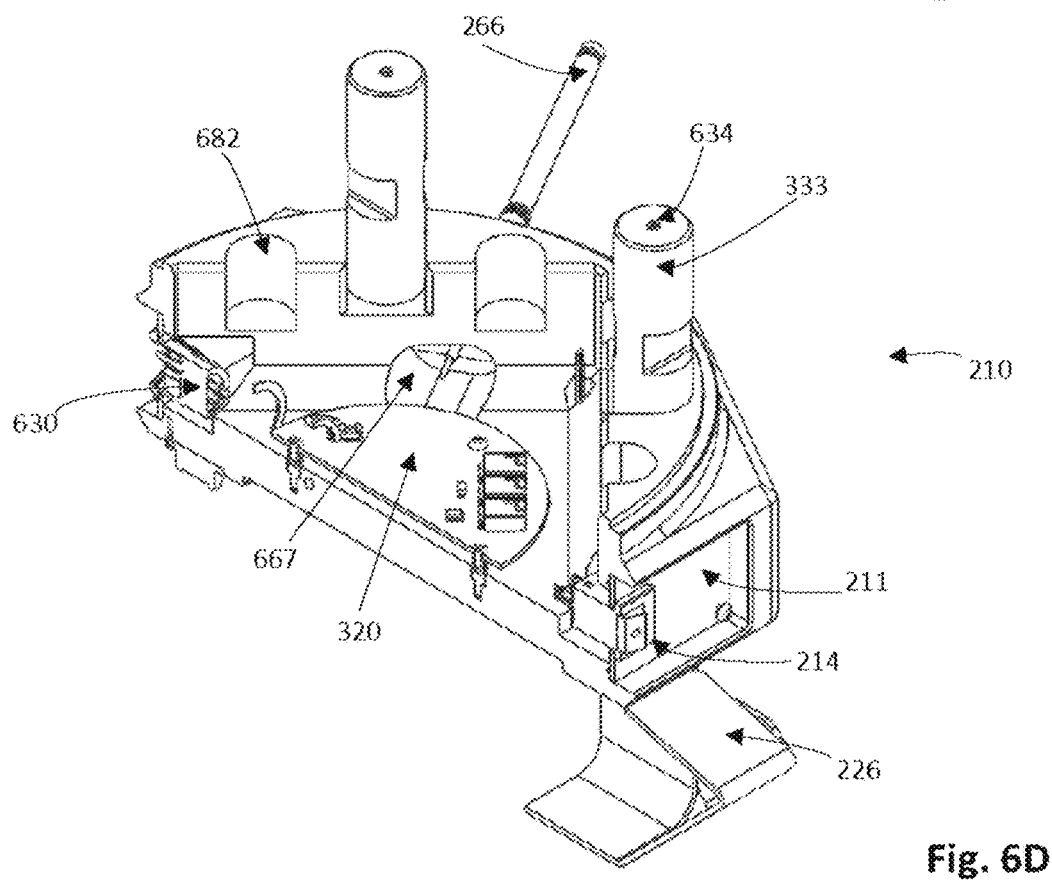

FIGS. 6C and 6D show cross-sectional views of the upper part 210 of data acquisition unit 110 according to some embodiments.

Upper part 210 may comprise modem port 690, as shown in FIG. 6*c*. Modem port 690 may also be referred to as modem serial port 690, or modem comms 690. Modem port 690 may be a port for attaching cabled connections to connect modem 290 to peripheral printed circuit board 320, printed circuit board 310, and/or processor 984.

Upper part 210 may comprise water proof O-rings or other sealing components, such as water-proofing O-ring 631, to better seal housing 205 from water/debris, as shown in FIG. 6*c*.

Upper part 210 may comprise one or more upper part cavities 682, as shown in FIG. 6*d*. The one or more upper part cavities 682 may be located on an underside surface of upper part 210. The one or more upper part cavities 682 may be recesses in upper part 210 formed to partially receive or accommodate one or more power clamps 434 and/or one or more power clamp structures 433. Upper part 210 may comprise 2 to 10 upper part cavities 682. In some embodiments, upper part 210 may comprise 2, 3, 4, 5, 6, 7, or 8 upper part cavities. In some embodiments, upper part 210 comprises 8 upper part cavities 682.

Upper part 210 may also comprise communications antenna recess 667, as shown in FIG. 6*d*. In some embodiments, communications antenna recess 667 may be a recess to permit cables to connect from within housing 205, such as from printed circuit board 310 to connect to antenna connector 216 and communications antenna 266. In some embodiments, a similar recess to the recess for communications antenna 266 is used to allow connections to other components on upper part 210, such as passive GNSS antenna 262.

In some embodiments, each of the one or more integration columns 633 may comprise a column screw recess 634, as shown in FIG. 6*d*. Column screw recess 634 may be a recess on a surface of integration column 633 which can receive housing screw 634 to secure the integration column 633 to bottom part 230.

FIG. 7 is a schematic diagram showing components of the data acquisition unit 110 according to some embodiments.

According to some embodiments, charge port 630 may be a panel mountable connector. Charge port 630 may be referred to as battery charge port 630. Charge port 630 may be an XLR connector. Charge port 630 may be a Switchcraft B3MH. Charge port 630 may include a dust cap. The dust cap of charge port 630 may be a CPMSB. Charge port 630 may be cable connected to either printed circuit board 320 or printed circuit board 310. As shown in FIG. 7, charge port 640 is cable connected to peripheral printed circuit board 320.

In some embodiments, debugging port 672 may be a panel mountable connector. In some embodiments, debugging port 672 is a receptacle connector. In some embodiments, debugging port 672 is an Amphenol LTW M12A-08PFFS-SF8002 or M12A-12PFFS-SF8002, for example. Debugging port 672 may be cable connected to either printed circuit board 320 or printed circuit board 310. As shown in FIG. 7, debugging port 672 is cable connected to peripheral printed circuit board 320.

In some embodiments, modem port 690 may be a panel mountable connector. In some embodiments, modem port 690 is a receptacle connector. In some embodiments, modem port 690 is an Amphenol LTW M12A-08PFFP-SF8001. Modem port 630 may be cable connected to either printed circuit board 320 or printed circuit board 310. As shown in FIG. 7, modem port 630 is cable connected to peripheral printed circuit board 320.

In some embodiments, button 214 is a switch button as shown in FIG. 7. Button 214 may also be referred to as power switch 214. Button 214 may be an SPST switch. Button 214 may be an SPST JWMW11RA2A switch. In some other embodiments button 214 is a push button. Button 214 may be cable connected to either printed circuit board 320 or printed circuit board 310. As shown in FIG. 7, button 214 is cable connected to peripheral printed circuit board 320.

In some embodiments, LED indicator 270 is a multi-colour indicator. As shown in FIG. 7, LED indicator 270 is a bi-colour indicator. LED indicator 270 may be cable connected to either printed circuit board 320 or printed circuit board 310. As shown in FIG. 7, LED indicator 270 is cable connected to peripheral printed circuit board 320. LED indicator may be an APEM Q8F7BZZRYG02E, for example.

Level indicator 280 may be a bulls-eye indicator. Level indicator 280 may be a Spirit Level RS PRO 667-3913, as shown in FIG. 7.

Communications antenna 266 may be a LoRa antenna, as shown in FIG. 7. Communications antenna 266 may be a LoRa Antenna ANT-916-CW-HWR-SMA, as shown in FIG. 7. Communications antenna 266 may be cable connected to either printed circuit board 320 or printed circuit board 310. As shown in FIG. 7, communications antenna 266 is cable connected to printed circuit board 310.

Passive GNSS antenna 262 may be a monopole antenna, such as TS.07.0113, for example. In some other embodiments, device 213 and/or data acquisition unit 110 includes both active GNSS antenna 264 and passive GNSS antenna 262. Passive GNSS antenna 262 may be cable connected to either printed circuit board 320 or printed circuit board 310. As shown in FIG. 7, passive GNSS antenna 262 is cable connected to printed circuit board 310. In some other embodiments, data acquisition device 213 and/or data acquisition unit 110 does not include passive GNSS antenna 262, but instead includes active GNSS antenna 264. Passive GNSS antenna 262 may be a GPS antenna, as shown in FIG. 7. Active GNSS antenna 264 may be GPS Antenna MIK-ROE-363.

Power source 330 may be an encased battery pack, as shown in FIG. 7, containing one or more cells. Power source 330 may be a 3S12P Li-Ion battery pack, as shown in FIG. 7. In some other embodiments, power source 330 may be a S316P Li-Ion battery pack. In some embodiments, the selection of power source 330 in data acquisition device 213 may be influenced by power requirements of the satellite modem 290. Power source 330 may be cable connected to either printed circuit board 320 or printed circuit board 310. As shown in FIG. 7, power source 330 is cable connected to peripheral printed circuit board 320.

Vibration transducer 350 may be a Seis Tech ST-2A geophone, as shown in FIG. 7. Vibration transducer 350 may be cable connected to either printed circuit board 320 or printed circuit board 310. As shown in FIG. 7, vibration transducer 350 is cable connected to printed circuit board 310.

Data acquisition device 213 may also comprise a circuit boards connection 311. Circuit boards connection 311 may provide power and/or data transmission between components mounted or connected to printed circuit board 310 and peripheral printed circuit board 320.

Circuit boards connection 311 may comprise one or more cabled connections 312. Each of one or more cabled connection 312 may be a cable assembly. Each of one or more cabled connection 312 may be a rectangular cable assembly. Circuit boards connection 311 may comprise one, two, three, or four cabled connections 312. In some embodiments circuit boards connection 311 comprises two cabled connections 312a and 312b, as shown in FIG. 7. In some embodiments two or more cabled connections may reduce the number of communication lines per cable assembly, thereby better fitting within one or more cable recess 422. In some embodiments, cabled connections 312a is a Molex 2147501062. In some embodiments, cabled connection 312b is a Molex 2147501082.

Circuit board connections may also comprise one or more peripheral PCB connection points 313 and one or more lower PCB connection points 314. One or more peripheral PCB connection points 313 and one or more lower PCB connection points 314 may be headers. One or more peripheral PCB connection points 313 may be mounted on peripheral printed circuit board 320. One or more lower PCB connection points 314 may be mounted on printed circuit board 310. One or more peripheral PCB connection points and one or more lower PCB connection points 314 may both be connected to one or more cabled connections 312 and to components and/or wires connected/mounted on printed circuit boards 310 and 320. Circuit boards connection 311 may comprise one, two, three, or four peripheral PCB connection points 313 and lower PCB connection points 314. In some embodiments circuit boards connection 311 comprises two peripheral PCB connection points 313a and 313b, and two lower PCB connection points 314a and 314b, as shown in FIG. 7.

Figure 8A:
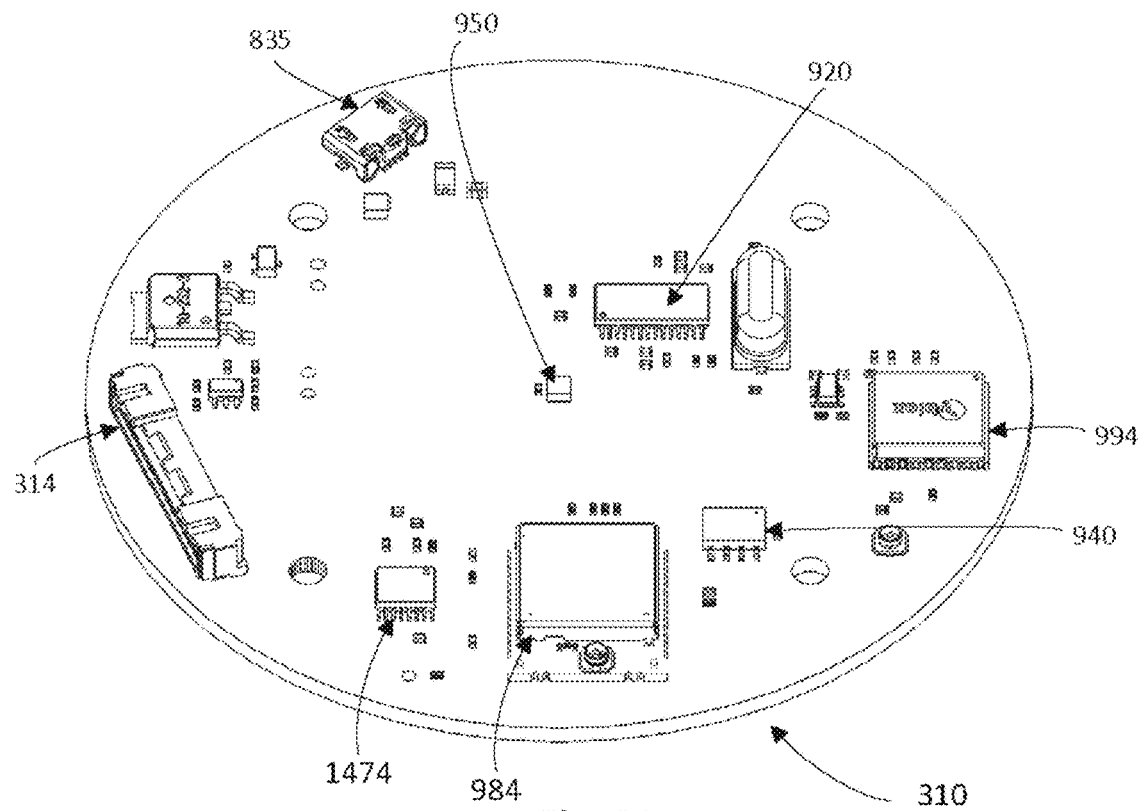
FIGS. 8A and 8B show the printed circuit boards of the data acquisition unit according to some embodiments.
Figure 8B:
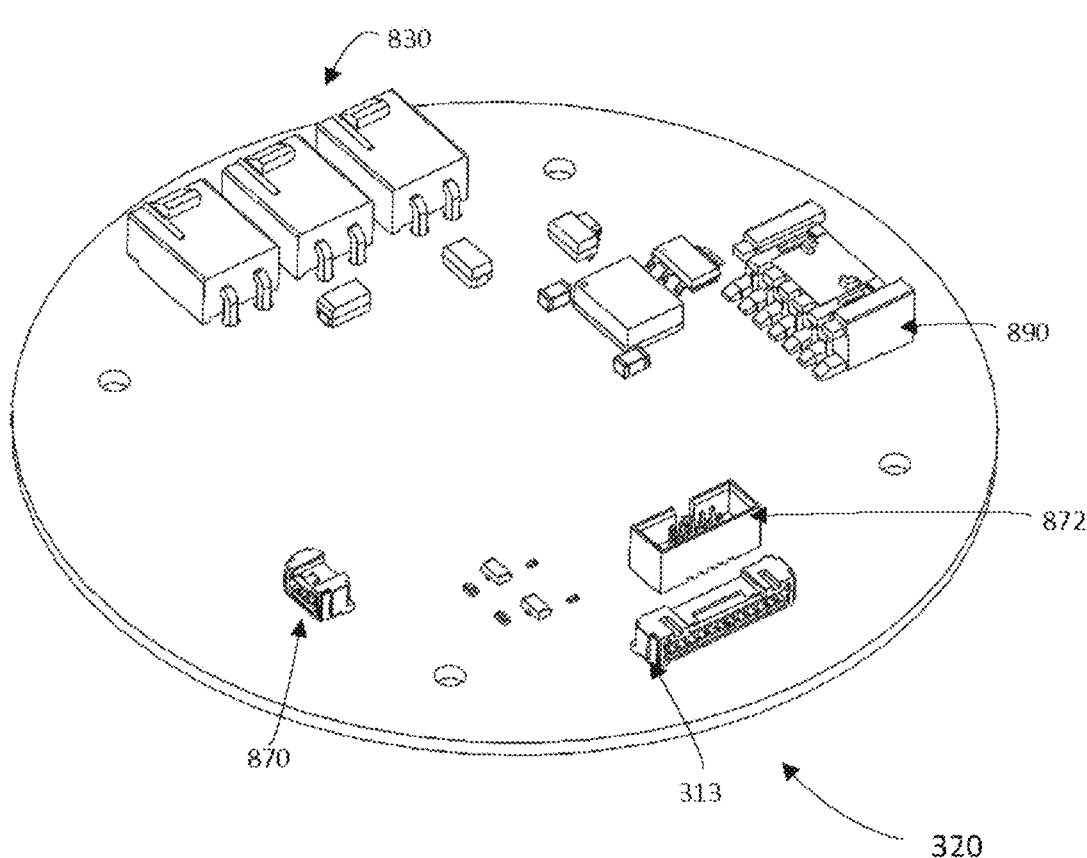

FIGS. 8A and 8B show the printed circuit boards of the data acquisition unit 110 according to some embodiments. Printed circuit board 310 and printed circuit board 320 may also bear electronic components to each form a respective printed circuit board assembly.

Printed circuit board 310 may mount inertial measurement unit 950, analogue to digital converter 920, volatile memory 940, processor 984, one or more lower PCB connection points 314, GNSS unit 994, serial unit 1474, and power port 835, as shown in FIG. 8A. Power port 835 may allow connection of external power to power components mounted or connected to printed circuit board 310.

Peripheral printed circuit board 320 may mount connectors 830, modem connector 890, led connector 870, one or more peripheral PCB connection points 313, and debugging connector 872. Printed circuit board 320 may also comprise a power regulator.

Connectors 830 may provide an interface from cabled connections from power source 330, button 214, and/or charge port 630 to components and/or wires on printed circuit board 320.

Modem connector 890 may provide an interface from cabled connection from satellite modem 290 to components and/or wires on printed circuit board 320.

LED connector 870 may provide an interface from cabled connection from LED indicator 280 to components and/or wires on printed circuit board 320.

Debugging connector 872 may provide an interface from cabled connection from debugging port 672 to components and/or wires on printed circuit board 320.

Figure 19A:
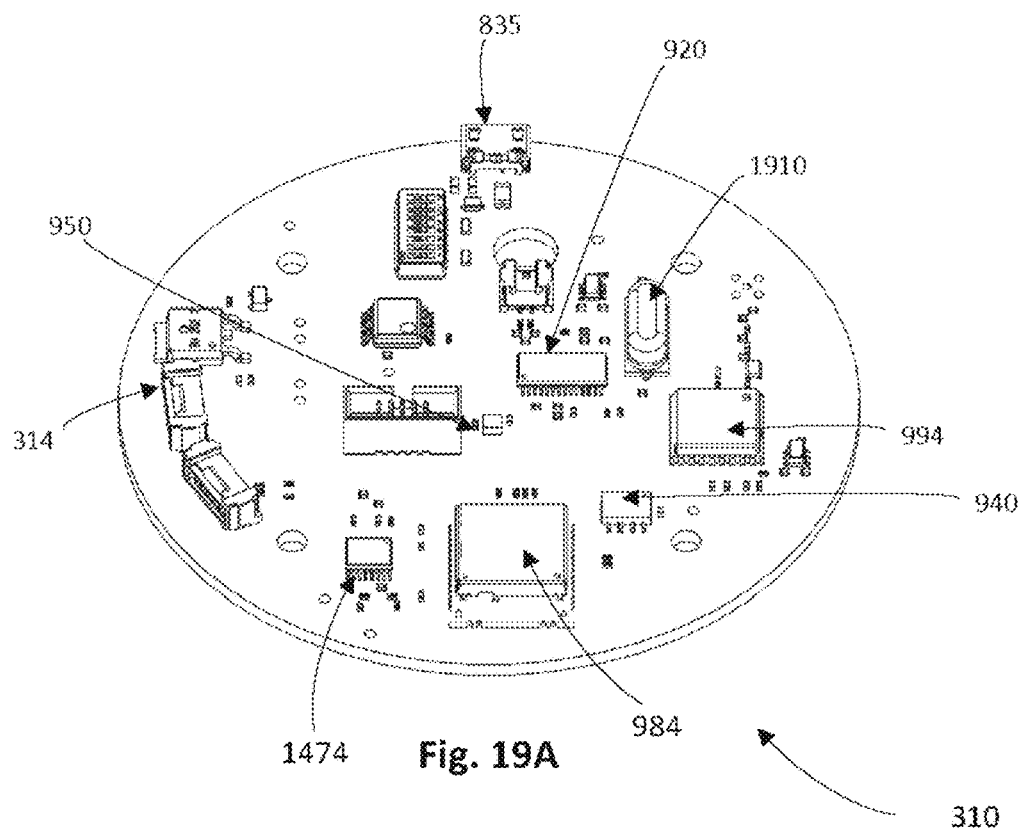
FIGS. 19A and 19B show the printed circuit boards of the data acquisition unit according to some other embodiments.
Figure 19B:
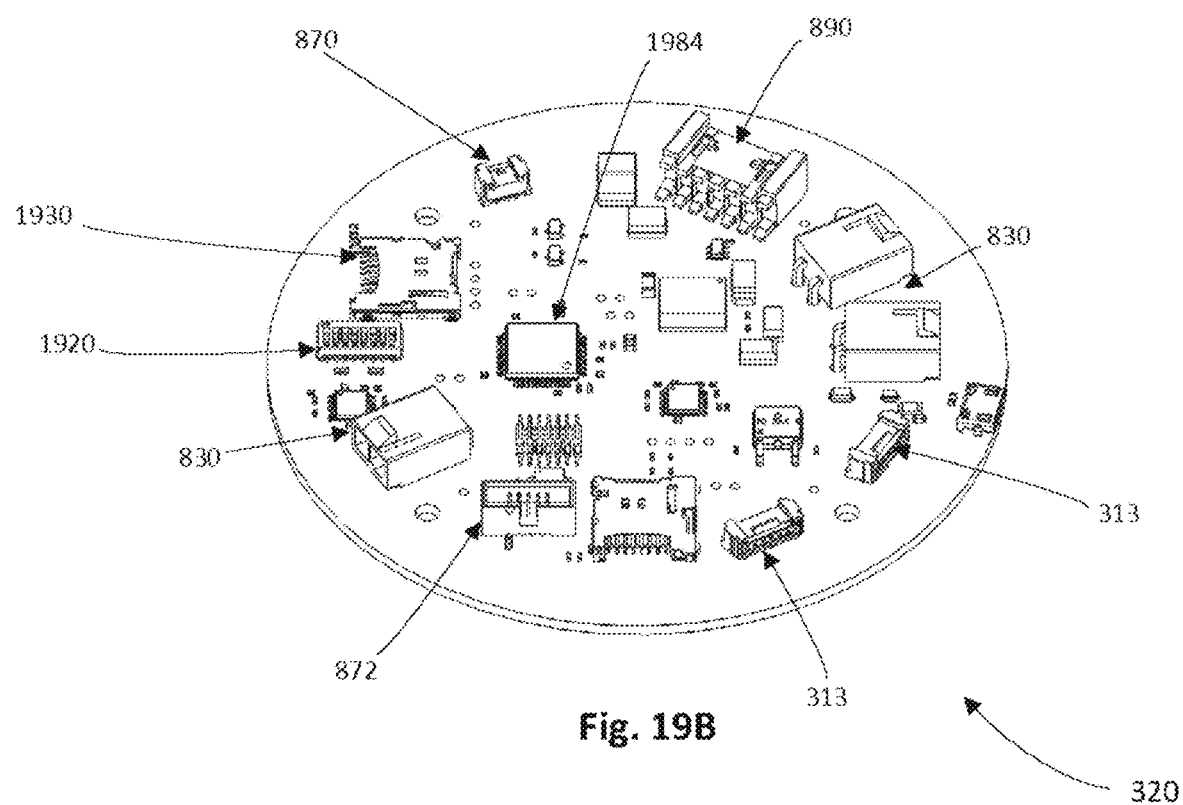

FIGS. 19A and 19B show examples of printed circuit boards 310 and 320 according to some other embodiments.

According to some other embodiments, printed circuit board 310 includes a crystal oscillator 1910. Crystal oscillator 1910 may be communicatively and/or electrically coupled to analogue to digital converter 920. Crystal oscillator 1910 may provide a stable clock input to the ADC 920, at a much higher rate than the ADCs 920 sampling rate.

According to some other embodiments, printed circuit board 320 includes removable auxiliary memory 1930. Removable auxiliary memory 1930 may also be referred to as expandable memory 1930. In some embodiments, removable auxiliary memory 1930 may allow data acquisition unit 110 storage for retransmission, back-up and/or recovery. Removable auxiliary memory 1930 may be an attachable memory source, such as an SD-card or flash memory. In some embodiments, removable auxiliary memory 1930 is a micro-SD card. Removable auxiliary memory 1930 may be housed and/or connectable in an expandable memory reader mounted on printed circuit board 320 and/or 310.

Removable auxiliary memory 1930 may be used to store pre-processed data as it is batched and before it is transmitted via the modem 290. Removable auxiliary memory 1930 may be configured to store no more than 2 to 10 days of pre-processed data and/or a full battery charge worth of data sampling and transmission.

Processor 984 may store a copy of the pre-processed data in removable auxiliary memory 1930, and maintain pre-processed data as a contingency in the case that there is a problem with transmitting some or all of the pre-processed data to the satellite 130, backhaul communications, modem 290, or server system 150, etc. The pre-processed data can then be downloaded via the debugging port 872 of the data acquisition unit 110 by a user/field operator, for example, when the data acquisition units 110 have been collected from the field. Therefore, the storage of copied pre-processed data in removable auxiliary memory 1930 can aid data recovery after communication/component failure. In some embodiments, storage of copied pre-processed data can be accessed by processor 984 for re-transmission of the pre-processed data after communication and/or component failure.

According to some other embodiments, printed circuit board 320 includes an auxiliary processor 1984. Processor 1984 may form part of processing unit 902. Processor 1984 may be communicatively coupled to processor 984 and components on printed circuit board 320, such as removable auxiliary memory 1930, for example. Processor 1984 may handle communications between processor 984 (or processing unit 902), modem 290, and removable auxiliary memory 1930, for example. Processor 1984 may also provide additional processing and/or application software to assist processor 984.

According to some other embodiments, printed circuit board 320 includes one or more dual in-line package (DIP) switches 1920. The DIP switches 1920 are communicatively coupled to devices, such as communications unit 970, processor 1984 and/or processor 984. The DIP switches 1920 may be configured and/or configurable to alter the operating state and/or control operation of communications unit, processor 1984 and/or processor 984. For example. The DIP switches 1920 may be configured to boot-up communications unit 970, processor 1984 and/or processor 984 in a different mode or configuration without having to reflash a different firmware image. In some embodiments, the DIP switches 1920 may be configured to be toggleable by a user/field operator to set the LPWAN frequency of communications unit 970 to the required country configuration, such as toggling the communications unit 970 to operate between AU915 for Australia or EU868 for Europe, for example.

FIG. 9 is an example block diagram of a data acquisition unit 110 according to some embodiments.

Figure 14:
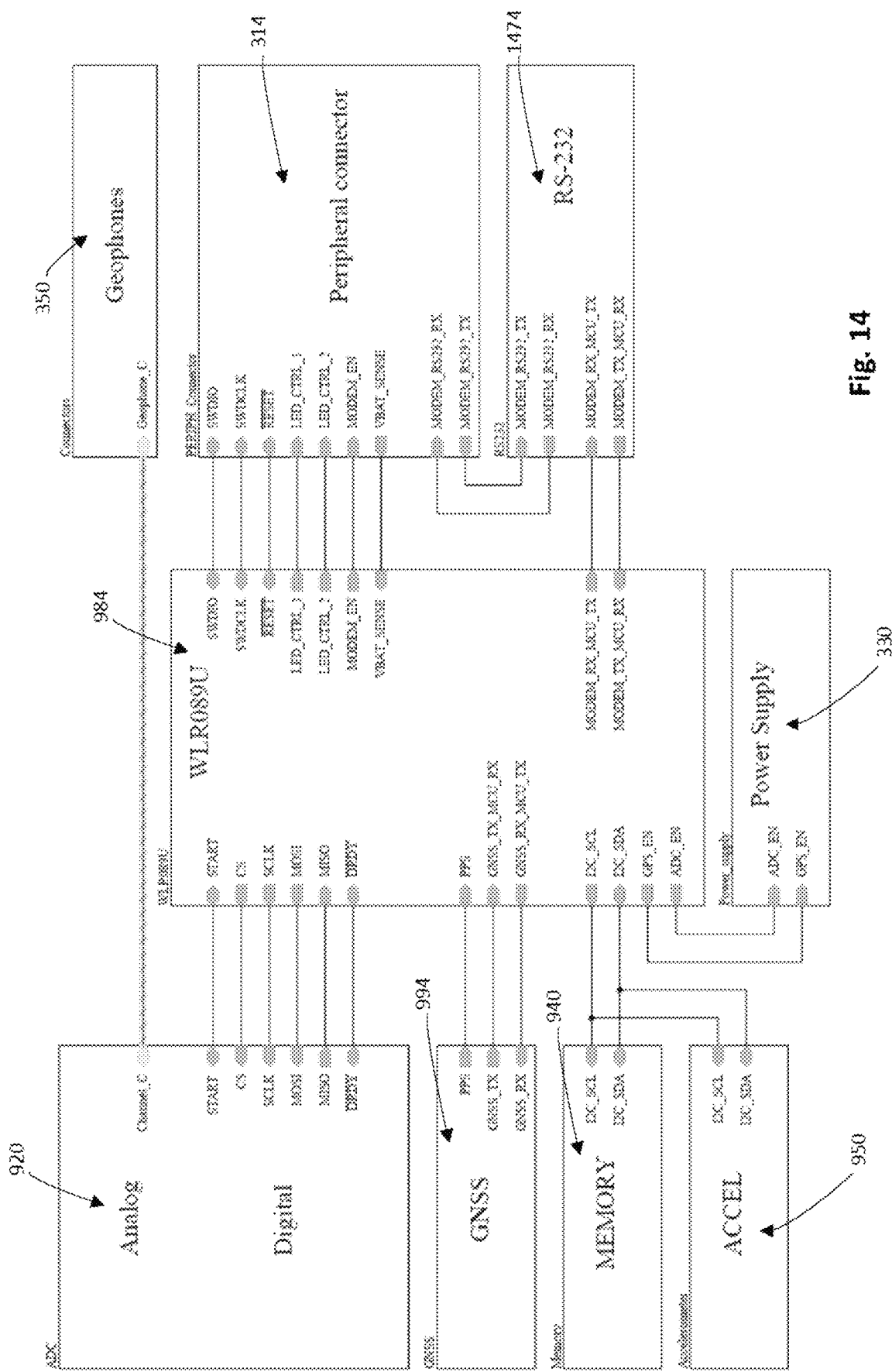
FIG. 14 shows a schematic diagram of electronic components of the data acquisition unit according to some embodiments.

Printed circuit board 310 may bear electronic components shown in FIGS. 9 and 14 to form a printed circuit board assembly.

The electronic components may comprise a processor 984, an analog to digital converter 920, geolocation unit (e.g. including a GNSS module) 994, power source 330, inertial measurement unit 950, components for connectivity to geophone 350, volatile memory 940, serial module 1474 and programmer/debugger unit. Inertial measurement unit 950 may be a micro-electromechanical systems (MEMS) accelerometer. Electronic components may also comprise any other connections or circuit elements, such as diodes, capacitors, inductors, resistors, and transistors.

In some embodiments, processor 984 is a microcontroller. Processor 984 forms part of processing unit 902. Processing unit 902 may comprise printed circuit board 310. Processing unit 902 or processor 984 may comprise volatile memory 940 and non-volatile memory 930 so that memory 940 and 930 are accessible to the microcontroller of processor 984. Processing unit 902 is responsible for controlling operation of the data acquisition unit 110, most of the work of which is performed by processor 984.

Non-volatile memory 930 may comprise operating system code 932. Non-volatile memory 930 may also comprise pre-determined or periodically determined operational parameters and device operation management code 934 as described in relation to FIG. 15. Non-volatile memory 930 may also comprise geophone sample handler code 936, as described below in relation to FIG. 13.

Volatile memory 940 may comprise a first samples buffer 942, s second samples buffer 944, and a payload queue 946, the functions of which are further described in FIG. 15.

In some embodiments, processor 984 is packaged with the data communications unit 970 including a chip for long-range wireless communications. In some other embodiments, the data communications unit 970 including the chip for long-range wireless communications is not packaged with processor 984, but instead is another electronic component which interfaces with processor 984 outside of the processor's package. In some embodiments, the data communications unit 970 is a LPWAN unit and the chip for long range wireless communications is an LPWAN chip. In some embodiments, the LPWAN chip is a LoRaWAN chip which utilises a LoRaWAN protocol. The LoRaWAN chip may be used for low-power consumption during transmission, as well as utilising communication range capabilities. The data communications unit 970 including the chip for long range wireless communications enables processor 984 to communicate with a user device. Data communications unit 970 may communicate via communications antenna 266.

GNSS unit 994 may enable processor 984 to communicate with a GNSS satellite 2010 for receiving positioning and timing data. The GNSS satellite may be a global positioning system (GPS) satellite, for example. GNSS unit 994 is communicatively coupled to passive GNSS antenna 262 and/or active GNSS antenna 264 via cabled connections.

Serial module 1474 may enable serial communications between processor 984, components within data acquisition unit 110, within data acquisition device 213, and/or external devices. Serial module 1474 may enable RS-232 communications via a serial bus, for example. Serial module 1474 may enable serial communications between processor 984 and modem 290, for example.

Power source 330 may supply power to processor 984 and other components on printed circuit boards 310 and 320. According to some embodiments, power source 330 may also be able to supply power to another external device, or other connected device. For example, the other device may be connected through a serial connection such as serial connector on data acquisition device 213.

ADC 920 may be used to convert voltages measured by components such as vibration transducer 350 and output the digital data to processor 984. In some embodiments, ADC 920 amplifies the signal using an in-built programmable gain amplifier (PGA) prior to outputting the digital data to processor 984. The ADC 920 in some embodiments is used with a vibration transducer to measure differential voltage proportional to the induced velocity.

In some embodiments, the electronic components are chosen for their low-power consumption and capability. Components may be chosen optimal to the design rather than being limited to commercial modules. In addition, the PCBA may be designed to consume as little power as possible to extend its battery life in the field.

Programmer/debugger unit may be implemented in hardware and/or software to assist analysis of errors in components and/or subsystems of data acquisition unit 110, such as processor 984. A programmer/debugger unit may be communicatively coupled to processor 984 and/or serial module 1474. In some embodiments, data acquisition unit does not comprise a programmer/debugger unit, but instead comprises external port connections, such as debugging port 672 and debugging connector 872, so that an external devices can communicate with processor 984 and perform programming and/or debugging functions.

Figure 10:
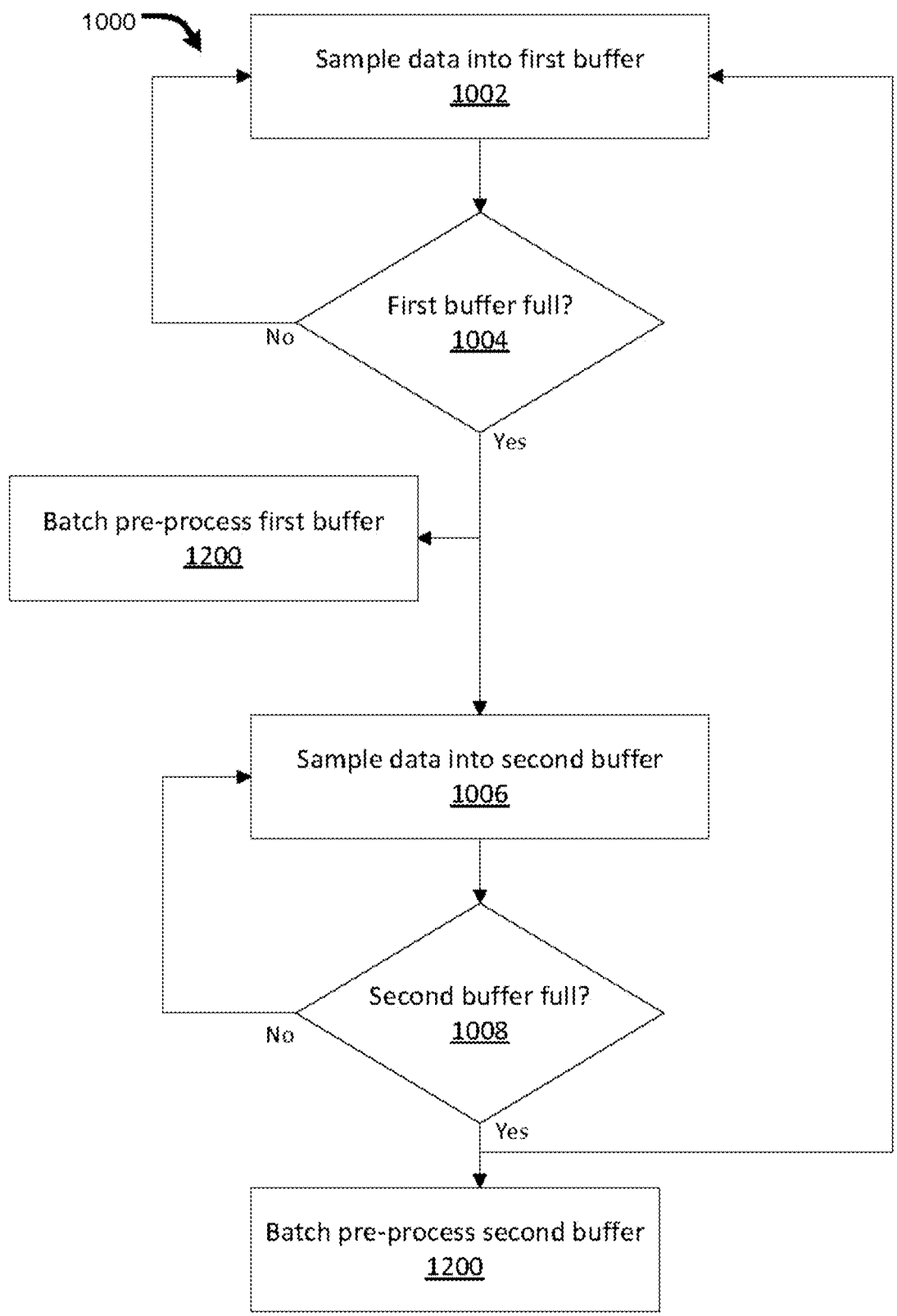
FIG. 10 shows a flow diagram of a method of sampling by data acquisition unit according to some embodiments.

FIG. 10 shows a flow diagram of a method of sampling by data acquisition unit 110 according to some embodiments.

In method 1000, data is sampled from the signal output of the vibration transducer 350 by the ADC 920 and then written into a first buffer at step 1002. If processor 984 detects the buffer has become full at step 1004, processor 984 batch pre-processes the first buffer with method 1200 whilst continuing to sample into the second buffer at step 1006. If processor 984 detects that the second buffer is full at step 1008, processor 984 batch pre-processes the second buffer with method 1200 whilst continuing to sample into the first buffer at step 1002.

Figure 11:
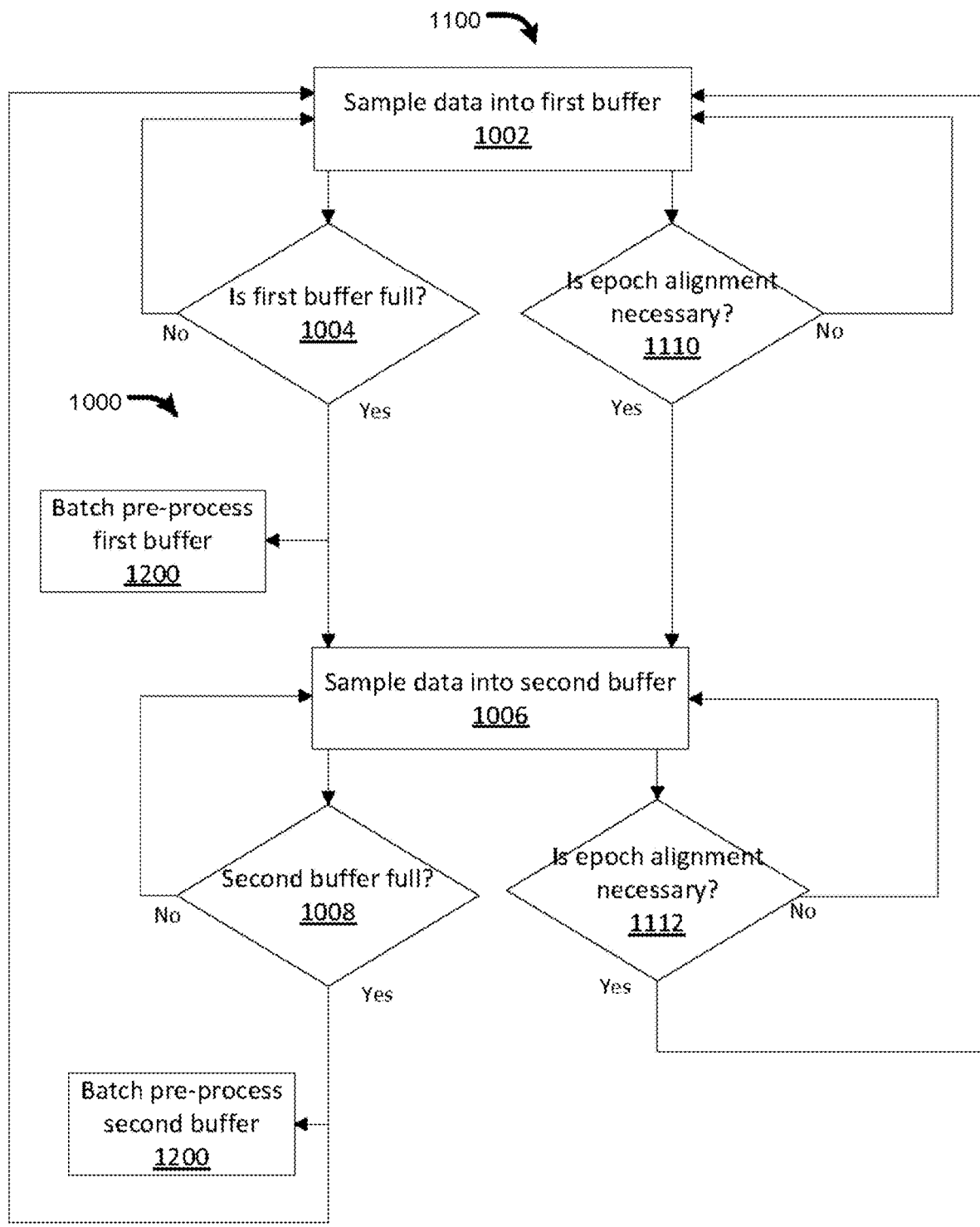
FIG. 11 shows a flow diagram of a method of sampling by data acquisition unit according to some other embodiments.

FIG. 11 shows a flow diagram of a method 1100 of sampling by data acquisition unit 110 according to some other embodiments. Method 1100 is similar to method 1000, except processor 984 performing method 1100 may stop sampling a buffer and shift sampling to another buffer upon an epoch alignment or synchronisation event, for synchronising with other seismic data acquisition units 110 in array 115. In some embodiments, an epoch alignment or synchronisation event is periodic. In some embodiments, periodic epoch alignment events may be performed at an interval of 15 minutes, 30 minutes, 1 hour, or 2 hours, for example.

Figure 17:
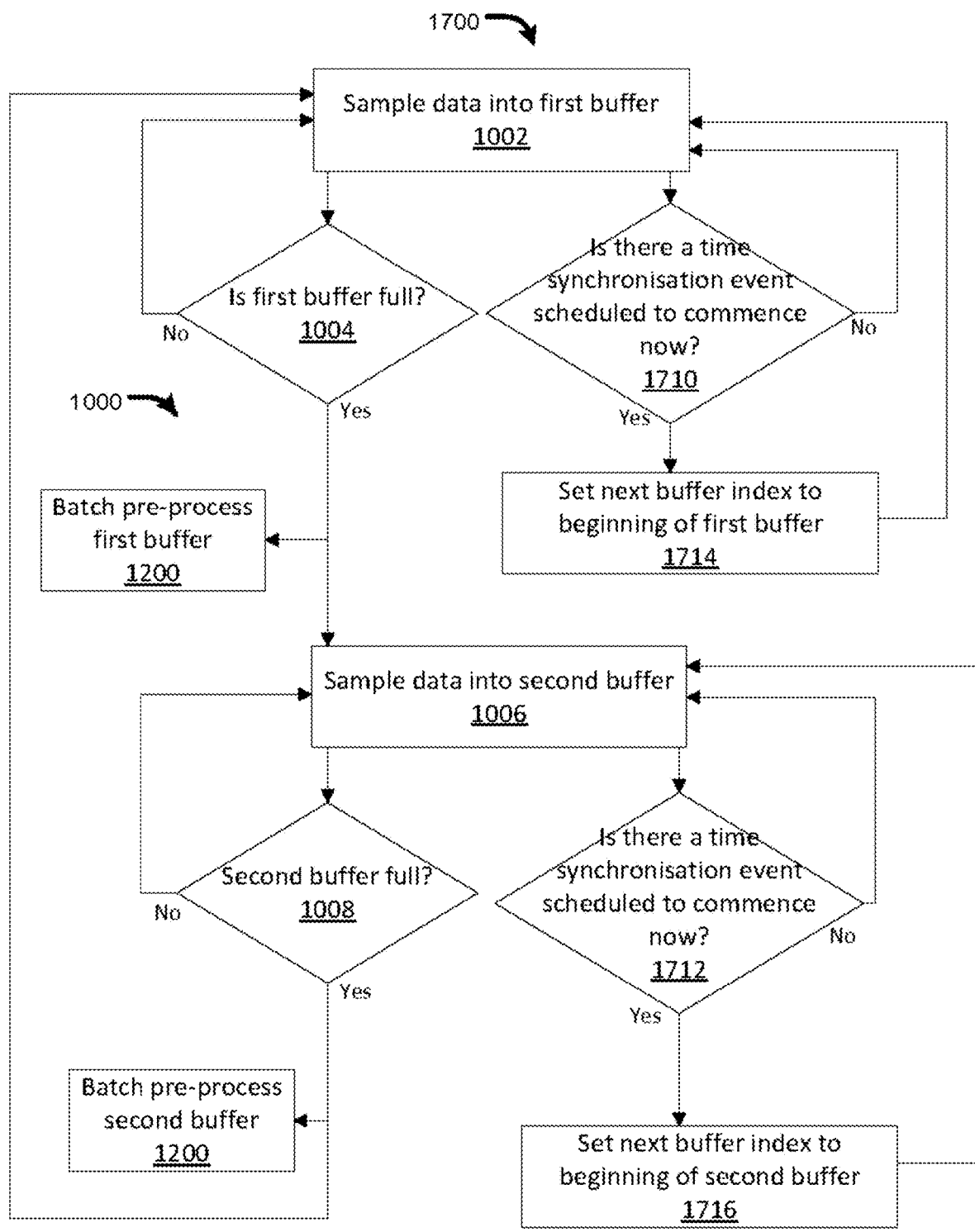
FIG. 17 shows a flow diagram of a method of sampling by data acquisition unit according to some other embodiments.

FIG. 17 shows a flow diagram of a method 1700 of sampling by data acquisition unit 110 according to some other embodiments. Method 1700 is similar to method 1000 and method 1100, as it includes steps 1002, 1004, 1200, 1006, 1008, and 1200, except the processor 984 performing method 1700 may stop sampling a buffer and rewrite/resample on the same buffer when a time synchronisation event is scheduled to commence at that time. Therefore, buffered data may be lost in performing the steps of method 1700. For example, processor 984 may check if there is a time synchronisation event scheduled to commence at that time at steps 1710 and 1712. If there is a time synchronisation event scheduled to commence at that point in time at step 1710 or 1712, processor 984 may then set a next sample buffer index to the beginning of the same buffer at steps 1714 or 1712 respectively. If there is a time synchronisation event scheduled to commence at that point in time at step 1710 or 1712, processor 984 will continue to sample data in the same buffer at the next buffer index at steps 1002 or 1006 respectively. In some embodiments, a time synchronisation event may occur at an interval of 1 minute, 5 minutes, 10 minutes, 15 minutes, 30 minutes, 1 hour, or 2 hours, for example.

Figure 12:
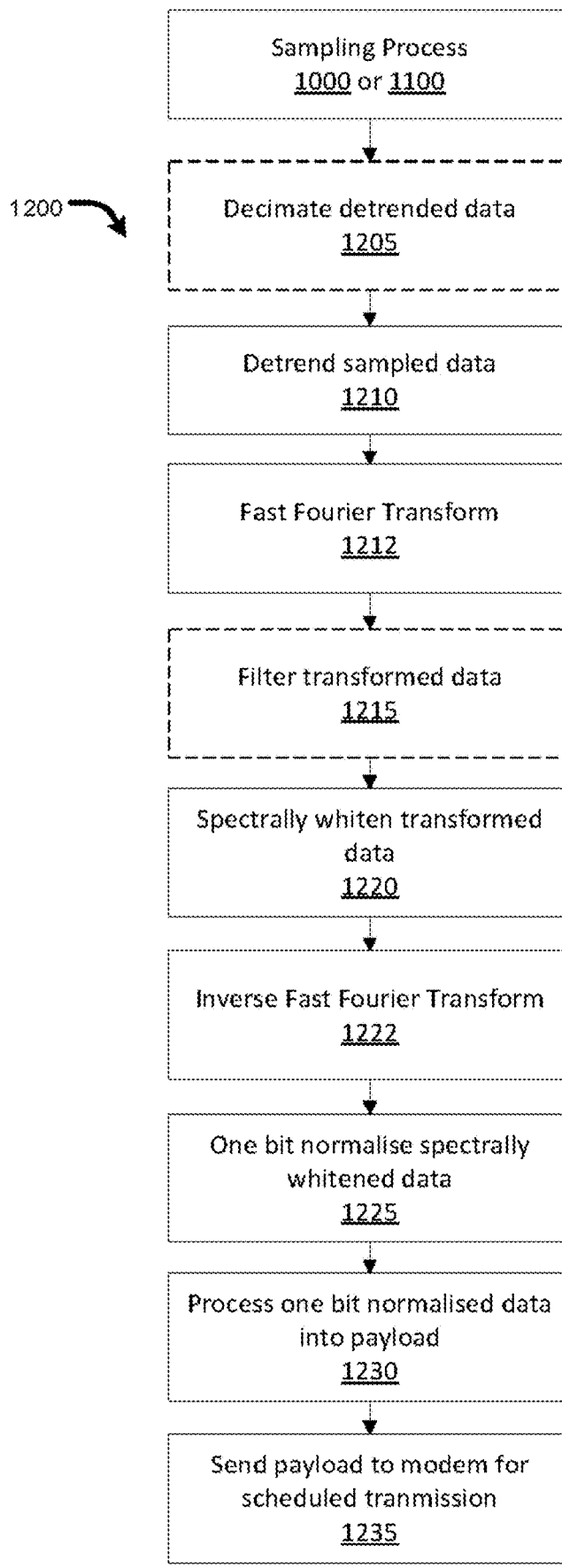
FIG. 12 shows a flow diagram of a method of pre-processing of the sampled data by the processor of data acquisition unit according to some embodiments.

FIG. 12 shows a flow diagram of a method 1200 of pre-processing of the sampled data by the processor 984 of data acquisition unit 110 according to some embodiments.

The method 1200 may condition the data collected from the geophone 350 and/or ADC 920 at method 1000 or 1100 for seismic analysis and to reduce the data size significantly. In some embodiments, processor 984 may require a lower sampling rate than ADC 920. For example ADC 920 may sample at 100 Hz but processor 984 may only sample at 25 Hz. Hence, at a first stage decimation at step 1205 may be required prior to detrending at step 1210. Therefore, before step 1210, method 1200 may begin with application of finite impulse response (FIR) filter on the sampled data from ADC 920. The FIR filter may be a low-pass filter to mitigate aliasing of the data prior to pre-processing. In some embodiments, the ADC may intrinsically sample at a high rate, for example 100 Hz, but also is configured to down-sample/decimate the samples to a lower rate, for example 25 Hz. In some embodiments, an RC filter is used between geophone 350 and ADC 920 to mitigate noise and aliasing. In some other embodiments, if ADC 920 does not support a desired lower sampling rate, for example 20 Hz, processor 984 may perform down-sampling/decimation.

Then processor 984 may decimate the data (i.e. by a factor of 4, for the above example sampling frequencies) before commencing step 1210. The decimation may be performed by a pre-determined factor that depends on the sampling rate. For example, the decimation factor may be two when the sampling rate is 50 Hz. In some embodiments, decimating at step 1210 may be optional and dependent upon the selected sampling rate. The second stage de-trends or de-biases the sampled data at step 1205. This is intended to remove inherent biases in the geophone signal (such as a DC bias or temperature influence). The third stage uses a fast Fourier transform (FFT) algorithm to convert the time-domain seismic signal into its frequency constituents at step 1212. This algorithm requires the data buffer size to be an exponent factor of two. With the data in the frequency domain, the signal can be filtered by applying pre-determined filter coefficients or making changes to the amplitude and frequency bins at step 1215. A low pass filter may be implemented on the de-trended or decimated data after FFT at step 1215. As such, the fourth stage of method 1200 spectrally whitens the frequency domain data at step 1220. By whitening the data, the amplitude across a frequency range may be normalised with a window function. The window function may have rounded edges, such as a Tukey window. The rounded edges of a Tukey window are intended to reduce any aliasing (artefacts) when transforming the data back into the time domain. The fifth stage then transforms the spectrally whitened data by using the inverse fast Fourier transform (IFFT) algorithm at step 1222. The sixth and final stage of this processing pipeline one-bit normalises the data at step 1225. Amplitudes that are positive are represented with a one, and contrariwise amplitudes that are negative are represented with a zero. Even though the amplitude information of the original seismic signal is essentially obliterated, the phase information of the signal is preserved. This is critical to the cloud processing side where the data is used to generate 3-D sub-surface models.

The one-bit normalisation compresses the data substantially, allowing the original four-byte sample (from a 32-bit analogue to digital converter) to be represented by a single bit. From the perspective of the payload that can be sent via the satellite modem, each byte will contain eight samples. This compression has significant advantages for the high power demands of satellite backhaul communications.

The one-bit normalised data is then processed into a payload at step 1230.

The payloads are sent to modem 290 for scheduled transmission at step 1235. In some embodiments, the payloads are first batched locally on volatile memory 940 before being sent to modem 290 at step 1235. In some embodiments, the payloads are first batched on removable auxiliary memory 1930 before being sent to modem 290 at step 1235. In some embodiments, the payloads are transmitted in a scheduled transmission time period with a randomised transmission time. The randomised transmission time may be determined using a unique identifier, such as a hardware serial number from the processor 984, as a randomisation key, for example. In some embodiments, the payloads are sent by processor 984 to modem 290 at a randomised time using the unique hardware serial number from the processor 984 as a key, then enabling modem 290 to perform the scheduled transmission. This may allow a plurality of nearby data acquisition units 110 to avoid interference with each other for their scheduled uplink transmissions, particularly when the data acquisition units 110 of data acquisition array 115 are synchronised with their respective seismic data sampling.

Figure 13:
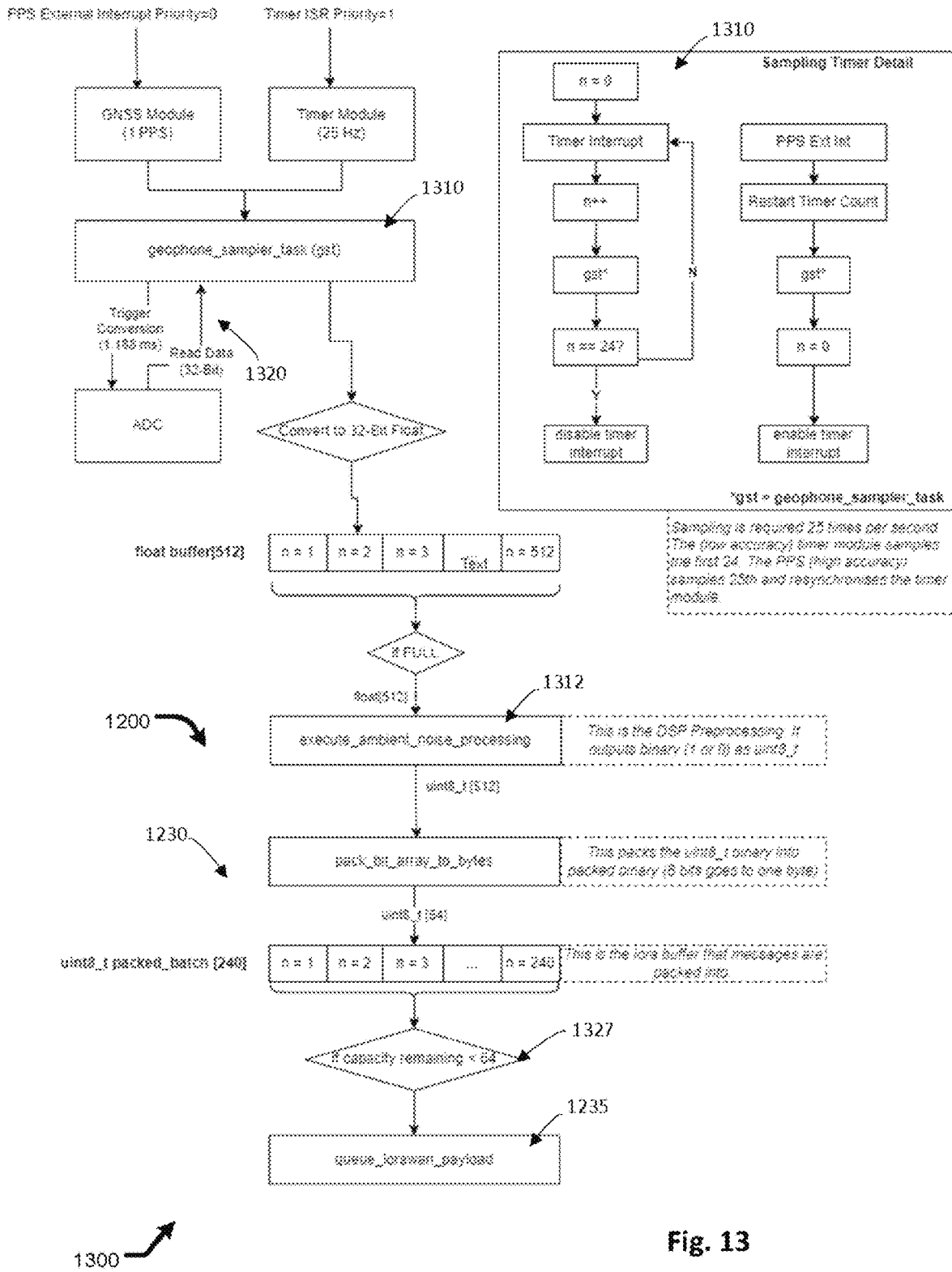
FIG. 13 shows a flow diagram of a method of sampling and pre-processing by the data acquisition unit according to some embodiments.

FIG. 13 shows a flow diagram of a method 1300 of sampling and pre-processing by the data acquisition unit 110 according to some embodiments.

As mentioned with regards to method 1000, data is sampled and stored in a buffer before being pushed through a sequence of processing algorithms as described in method 1200. At the beginning of method 1300, the data from sensed vibrations may be sampled at step 1310. At step 1320, the sampled data may then be transmitted to an analogue to digital converter 920 and each sample is converted into a 32-bit float number, and that number is sent to a sample buffer. Steps 1310 and 1320 combined are similar or equivalent to steps 1002 or 1006 of method 1000 of FIG. 10. The sample buffer may hold 512 samples, for example. In some other embodiments, the sample buffers may hold 64, 128, 256, or 1024 samples, for example. Once the sample buffer is full, method 1300 may continue with the execution of ambient noise processing at step 1312. Those processing algorithms for executing ambient noise processing at step 1312 may include steps 1205, 1210, 1212, 1215, 1220, 1222, and/or 1225 shown and described in relation to FIG. 12, for example.

Once the processed data is ready, it is batched into the payload that will be transmitted. In some embodiments, the data is transmitted on a payload of 240 or more bytes from the processor 984 to modem 290. In some embodiments, some additional flash memory may be added to the printed circuit board 310. The intent is to concatenate pre-processed data batches with this local memory into one large payload over time. Once filled, the payload will be sent to the modem 290 for transmission to a satellite 130 during overpass. This is advantageous because transmitting fewer, larger payloads with the modem is more power-efficient than sending many smaller payloads.

Timing is relevant to the ambient noise tomography technique. The GNSS module 994 may provide a synchronisation payload to processing unit 902 at boot or at a predetermined timing, for example every 4 hours, 2 hours, 1 hour, 30 minutes, 10 minutes, or 1 minute. To keep precise timing, a pulse per second (PPS) signal generated from the GNSS module 994 may be used to drive the on-board system clock of processor 984. This pulse is synchronous across each GNSS module 994 of data acquisition units 110 and data acquisition devices 213 of data acquisition array 115 with a satellite fix. Instruments deployed in the field are intended to be synchronised and to maintain their timing with the same PPS signal. A separate hardware timer inside processing unit 902 can be used to generate an interrupt service routine (ISR) and sample the geophone. If the sample rate is 25 Hz, 25 samples are expected to be collected within one cycle of the PPS. If there are any latency issues with the timing, then the PPS can correct the timer. As shown at step 1310, the processor 984 executing geophone sampler 936 may perform the interrupt service routine to sample every $25^{th}$ sample, triggered by the hardware timer interrupt.

In some other embodiments, the hardware timer inside processing unit 902 drives the milliseconds of the on-board clock. In some other embodiments, sampling of the geophones is driven by the ADC 920. ADC 920 then can signal to processing unit 902 when a sample is ready to be stored in the sample buffer 942 or 944. If the ADC 920 drives the sampling, there is no need to use the PPS to align the sampling buffer. The ADC 920 sampling is synchronised every five minutes by a signal sent from processing unit 902 based on a software timer executed by processor 902. In some other embodiments, at step 1310, the ADC 920 can signal to processing unit 902 when a sample is ready to be stored in the sample buffer 942 or 944, at a sampling rate of 25 Hz. The ADC 920 may be provided a highly stable and consistent clock source by crystal oscillator 1910, to assist driving the sampling of the ADC 920.

The sampling rate may be 25 Hz according to some embodiments. In some embodiments, the sample rate may be between 10 Hz to 20 Hz, 15 Hz to 30 Hz, or 20 Hz to 40 Hz. In some embodiments, the sampling rate may be about 5 Hz, 10 Hz, 15 Hz, 20 Hz, 30 Hz, 40 Hz, 50 Hz, or 100 Hz, for example.

Once the ambient noise processing is executed at step 1312, the 512 samples (now each represented by a bit) are processed into a 64 byte array, and then placed into a communications buffer at step 1230. The communications buffer may be 240 bytes, for example. Communications buffer may be between 120 to 6400 bytes, for example. In some other embodiments the communications buffer may be about 150 bytes, 300 bytes, 480 bytes, 1200 bytes, 2400 bytes, 3600 bytes, or 6400 bytes for example.

If the communications buffer has less than 64 bytes remaining at step 1327 processor 984 may then send the data in the communications buffer to the satellite modem 290 at step 1235.

FIG. 14 shows a schematic diagram of electronic components of the data acquisition unit 110 according to some embodiments.

As described above, the electronic components of data acquisition device 213 may include analogue to digital converter 920, vibration transducer 350, processor 984, serial module 1474, volatile memory 940, inertial measurement unit 950, GNSS unit 994, power source 330, and lower PCB connection points 314, as shown in FIG. 14.

Inertial measurement unit 950 may be used to determine the orientation and/or the attitude of the data acquisition unit 110 and data acquisition device 213 after it is deployed. The orientation measured by inertial measurement unit 950 can be signalled to processing unit 902. Processing unit 902 can then send the orientation information reporting as a part of a health data payload in a signal to be transmitted by modem 290 over satellite to be received by server system 150 and then visualised on a user device, for example, client device 160. In some other embodiments, processing unit 902 can send the health data payload LPWAN communications, via data communications unit 970 and communications antenna 266, to a technician in the field. If the orientation of the data acquisition unit 110 and/or data acquisition device 213 has been manipulated at any time due to external disturbances (wind, rain, animals, etc.) then it will impact the sensitivity of the geophone 350 and thus the data quality. This allows a user/technician to go out and resolve the problem only when needed, mitigating the risks and costs of having somebody in the field manually inspecting the data acquisition units 110. In some embodiments, server system 150 is configured to transmit to client device 160 a current and/or historical measurement of the attitude or orientation of data acquisition unit 110 based on a determination of one or more health data payloads received from data acquisition unit 110. In some embodiments, server system 150 is configured to transmit to client device 160 an alert to client device 160 indicating a change of the attitude or orientation and/or an amount of change of the attitude or orientation of data acquisition unit 110 to a previous attitude or orientation of the data acquisition unit 110, based on a determination from two or more health data payloads received from data acquisition unit 110.

Figure 20A:
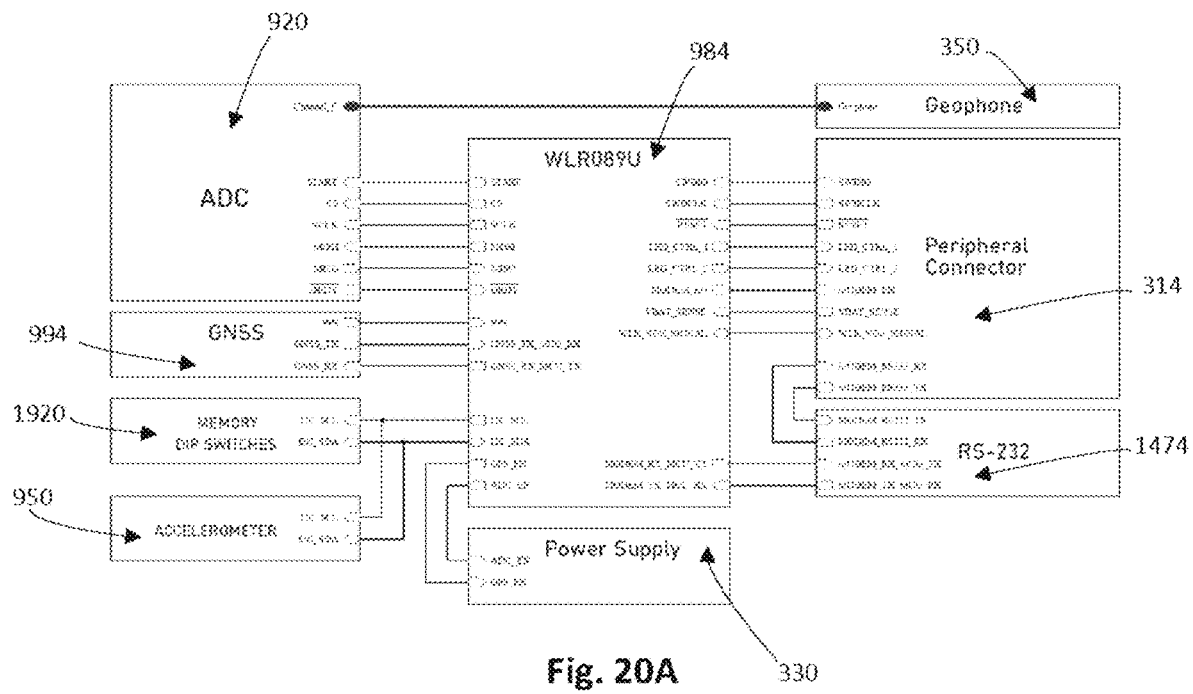
FIGS. 20A and 20B show a schematic diagram of electronic components of the data acquisition unit according to some other embodiments.
Figure 20B:
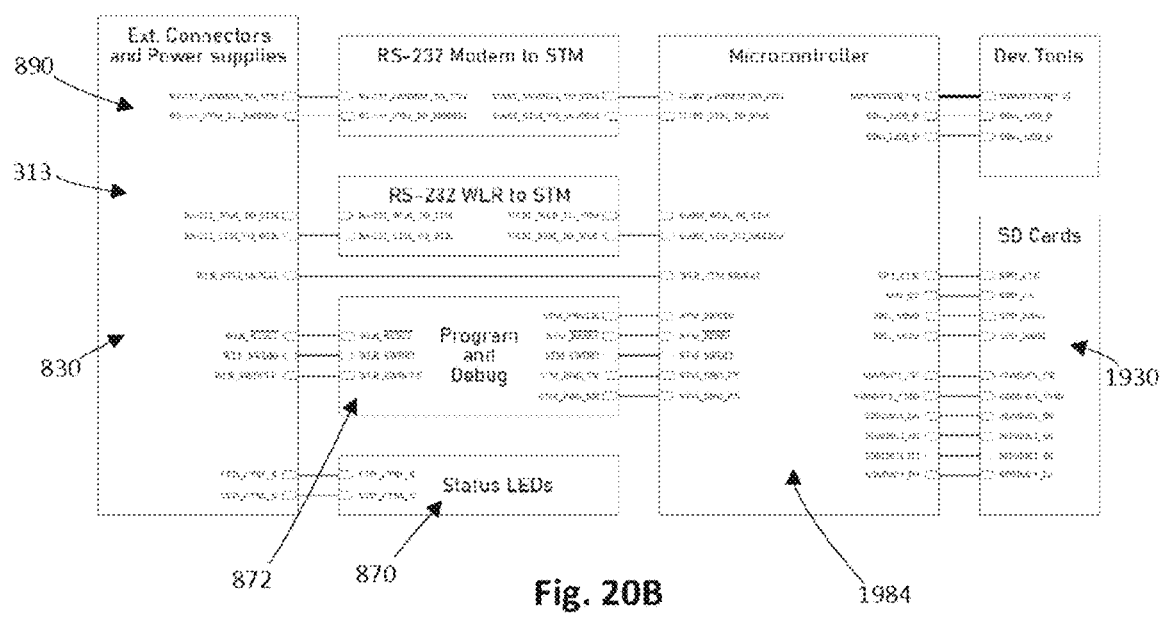

FIGS. 20A and 20B show schematic diagrams of electronic components of the data acquisition unit 110 according to some other embodiments.

As described above, the electronic components of data acquisition device 213 may include ADC 920, vibration transducer 350, processor 984, serial module 1474, volatile memory 940, inertial measurement unit 950, GNSS unit 994, power source 330, and lower PCB connection points 314, as shown in FIG. 14.

In some embodiments, the electronic components of data acquisition device 213 also include inertial measurement unit 950, DIP switches 1920, LED connector 870, debugging connector 872, processor 1984, removable auxiliary memory 1930, modem connector 890, peripheral PCB connection point 313, and connectors 830.

FIGS. 15A, 15B, 15C, and 16 show some example 3-D sub-surface imaging according to some embodiments. The sub-surface imaging may be through ambient noise tomography processing.

Sub-surface imaging may be performed by server system 150 upon receiving preprocessed data of method 1200 from one or more data acquisition units 110 of data acquisition array 135. Representations and modelling of this imaging may be viewable on client computing device 160.

FIG. 15A shows a gravity method survey yielding a false positive result. This is in contrast to an ambient noise tomography method of FIG. 15B over the same sub-surface yielding a correct determination of anomalies. FIG. 15B is an example two-dimensional (2-D) splice of a 3-D model. Use of ambient noise techniques may allow dense bodies (typical sources of iron oxide copper-gold, or lithium, for example) to be identified.

In some embodiments, the data acquisition units 110 of data acquisition array 115 may be deployed in different configurations. In some embodiments, the survey area for imaging may be dependent upon the boundary defined by a perimeter of data acquisition units 110 of the data acquisition array 115. In some embodiments, the data acquisition units may be deployed in an evenly spaced rectangular formation with the imaging area a perimeter boundary defined by the outside data acquisition units 110. In some other embodiments, the data acquisition units 110 of data acquisition array 115 are not all evenly spaced from one another. In some other embodiments, the data acquisition units 110 of data acquisition array 115 are not deployed in a rectangular formation but another arrangement.

In some embodiments, data acquisition units 110 of data acquisition array 115 may be deployed at an equal or near equal distance from one another. In some embodiments, data acquisition units 110 may be deployed at a distance of about 20 metres to about 2 kilometres. In some embodiments, data acquisition units 110 may be deployed at a distance of about 30 metres to about 100 metres, about 100 metres to about 500 metres, or 500 metres to about 1.5 kilometres, for example. In some embodiments, data acquisition units 110 may be deployed at a distance of about 20 metres, 50 metres, 100 metres, 200 metres, 400 metres, 600 metres, 800 metres, 1 kilometre, 1.2 kilometres, 1.5 kilometres, or about 2 kilometres from one another, for example.

The spacing of the deployed data acquisition units 110 in data acquisition array 115 may influence the depth of imaging. The depth of imaging may be proportional to the spacing distance of the data acquisition units 110 of data acquisition array 115. In some embodiments, the depth of imaging may be about 5 times the spacing distance between each of the data acquisition units 110 of data acquisition array 115. The greater the spacing distance between data acquisition units 110 of data acquisition array, the greater the depth of the imaging. However, a greater spacing may lead to a decrease in image resolution.

In some embodiments, an adequate amount of ground-movement data from one or more data acquisition units 110 of data acquisition array 115 may be collected for server system 150 to generate a display of a first ground region on the user interface, and then at least one of the plurality of data acquisition units 110 may be repositioned at surface locations across a second ground region. Then at least one of the plurality of data acquisition units 110 is configured to collect a second amount of ground-movement data for a display of the second ground region before the power source 330 or supply requires recharging or replacing.

In some embodiments, the second amount of ground-movement data is an adequate amount of data collected for server system 150 to generate a display of the second ground region on the user interface.

In some embodiments, the data acquisition units 110 are repositioned from the first ground region to the second ground region via at least in part by vehicular transport.

In some embodiments, a further one or more data acquisition units 110 are deployed in the first ground region whilst server system 150 is receiving pre-processed ground movement data and/or performing ambient noise tomography and/or generating tomography data and/or generating the display. The server system 150 is then configured to receive and process further pre-processed ground movement data from the further data acquisition units 110 and perform ambient noise tomography and generate tomography data based on both the pre-processed ground movement data and the further pre-processed ground movement data. In some embodiments, one or more data acquisition units 110 of data acquisition array 115 in the first ground region are moved to another location within the first ground region whilst sampling is occurring, and the server system 150 is then configured to receive and process the new pre-processed ground movement data from the repositioned data acquisition units 110 and the stagnant data acquisition units 110 and perform ambient noise tomography and generate tomography data from the data sampled from the data acquisition array 115.

| | Parts List |
|---|---|
| 100 | Sub-surface Tomography System |
| 110 | Data acquisition unit |
| 115 | Data acquisition array |
| 118 | Satellite communication link |
| 130 | LEO Satellite |
| 135 | Satellite Constellation |
| 138 | Ground station communications link |
| 140 | Ground Stations |
| 148 | Server system communications link |
| 150 | Server System |
| 152 | Data storage |
| 154 | Tomography module |
| 156 | Data visualisation module |
| 157 | Client device communications link |
| 160 | Client computing device |
| 205 | Housing |
| 213 | Data acquisition device |
| 210 | Upper part |
| 211 | Side panel |
| 214 | Button |
| 216 | Antenna connector |
| 217 | Top surface of upper part |
| 218 | Modem receiving feature |
| 220 | Modem cap |
| 226 | Protection plate |
| 230 | Bottom part |
| 250 | Sensing probe |
| 251 | Distal tip |
| 252 | Probe recess |
| 262 | Passive GNSS antenna |
| 264 | Active GNSS antenna |
| 266 | Communications antenna |
| 270 | LED indicator |
| 280 | Level indicator |

-continued

| Parts List | |
|---|---|
| 290 | Satellite Module |
| 310 | Printed circuit board |
| 311 | Circuit boards connection |
| 312a | Cabled connection |
| 312b | Cabled connection |
| 313a | Peripheral PCB connection point |
| 313b | Peripheral PCB connection point |
| 314a | Lower PCB connection point |
| 314b | Lower PCB connection point |
| 320 | Peripheral printed circuit board |
| 330 | Power source |
| 333 | Integration column |
| 334 | Housing screw |
| 336 | Tool recess |
| 338 | Column receiving recess |
| 350 | Vibration transducer or ground sensing module |
| 352 | Probe gasket |
| 354 | Probe receiving recess |
| 355 | Probe buttress |
| 356 | Probe connection gasket |
| 362 | Top portion |
| 364 | Central portion |
| 366 | Bottom portion |
| 420 | Internal floor of bottom part |
| 422 | Cable recess |
| 430 | Enclosed wall |
| 431 | Inner surface of enclosed wall |
| 432 | Connection rim |
| 433 | Clamp structure |
| 434 | Power source clamp |
| 435 | Power source positioning bracket |
| 436 | Clamp screw recess |
| 437 | Cable guide |
| 440 | Column mounting portions |
| 630 | Charge port |
| 631 | Water proof O-ring |
| 672 | Debugging port |
| 690 | Modem port |
| 634 | Column screw recess |
| 667 | Communications antenna recess |
| 682 | Upper part cavities |
| 830 | Connectors |
| 835 | Power port |
| 870 | Led connector |
| 872 | Debugging connector |
| 890 | Modem connector |
| 902 | Processing unit |
| 984 | Processor |
| 930 | Non-volatile memory |
| 932 | OS code |
| 934 | System tick handler |
| 936 | Geophone sampler |
| 938 | Preprocessor code |
| 940 | Volatile memory |
| 942 | First samples buffer |
| 944 | Second samples buffer |
| 948 | Payload queue |
| 994 | GNSS unit |
| 950 | Inertial measurement unit |
| 920 | Analogue to digital converter |
| 910 | GNSS satellite |
| 1474 | Serial module |
| 1810 | Handle |
| 1812 | Handle ends |
| 1910 | Crystal oscillator |
| 1920 | DIP switches |
| 1930 | Removable auxiliary memory |
| 1984 | Processor |
| 2133 | Clamping sheet |
| 2250 | Engagement projection |

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:

1. A method of processing by a processor contained in a housing of a data acquisition unit suitable for seismic ambient noise tomography, the method including:
   sensing, via a vibration transducer of a ground movement data acquisition mechanism of the data acquisition unit, vibration in a ground region relative to the data acquisition unit and generating an electrical output signal based on the sensed vibration;
   receiving, via the processor, the electrical output signal and converting the electrical output signal to measured ground movement data;
   pre-processing the measured ground movement data and buffering the pre-processed measured ground movement data;
   processing the buffered pre-processed measured ground movement data to batch-generate a data payload before transmitting the data payload, via a satellite modem communicatively coupled to the processor via a modem port on the housing, to a satellite; and
   transmitting to the satellite the data payload at a randomised transmission time within a scheduled transmission time period.

2. A method of processing by a processor contained in a housing of a data acquisition unit suitable for seismic ambient noise tomography, the method including:
   sensing, via a vibration transducer of a ground movement data acquisition mechanism of the data acquisition unit, first vibrations in a ground region relative to the data acquisition unit and generating a first electrical output signal based on the sensed first vibrations;
   receiving, via the processor, the first electrical output signal and converting the first electrical output signal to measured first ground movement data;
   sensing, via the vibration transducer of the ground movement data acquisition mechanism of the data acquisition unit, second vibrations in the ground region relative to the data acquisition unit and generating a second electrical output signal based on the sensed second vibrations;
   receiving, via the processor, the second electrical output signal and converting the second electrical output signal to measured second ground movement data;
   sampling the measured first ground movement data in a first buffer and then batch pre-processing the first buffer to form batched pre-processed first ground movement data;
   sampling the measured second ground movement data in a second buffer and then batch pre-processing the second buffer to form batched pre-processed second ground movement data; and
   processing the batched pre-processed first ground movement data and the batched pre-processed second ground movement data to generate one or more data payloads; and
   transmitting the one or more data payloads, via a satellite modem communicatively coupled to the processor, to a communicatively coupled satellite.

3. The method of claim 2, wherein sampling in the second buffer is based on detecting that the first buffer is full.

4. The method of claim 3, wherein sampling in the first buffer comprises stopping sampling based on a time synchronisation event and re-sampling the first buffer.

5. The method of claim 4, further comprising receiving a signal indicative of the time synchronisation event from a GNSS module.

6. The method of claim 2, wherein sampling in the first buffer comprises stopping sampling in the first buffer and then sampling in the second buffer based on a time synchronisation event.

7. The method of claim 2, further comprising receiving a synchronised pulse per second signal from a GNSS module coupled to the housing.

8. The method of claim 2, further comprising using a hardware timer to drive an on-board clock of the processor.

9. The method of claim 2, wherein sampling in the first buffer and sampling in the second buffer are based on signalling from an analogue to digital converter to the processor.

10. A method of processing by a processor contained in a housing of a data acquisition unit suitable for seismic ambient noise tomography, the method including:
sensing, via a vibration transducer of a ground movement data acquisition mechanism of the data acquisition unit, vibration in a ground region relative to the data acquisition unit and generating an electrical output signal based on the sensed vibration;
receiving, via the processor, the electrical output signal and converting the electrical output signal to measured ground movement data;
pre-processing and buffering the measured ground movement data;
processing the pre-processed measured ground movement data to generate a data payload; and
transmitting the data payload, via a satellite modem communicatively coupled to the processor, to a communicatively coupled satellite.

11. A server system for performing ambient noise tomography, including processing circuitry and memory accessible to the processing circuitry, the memory storing code which, when executed by the processing circuitry, causes the processing circuitry to:
receive pre-processed ground movement data based on ground movement in a ground region from each of a plurality of data acquisition units resting on the ground region, the pre-processed ground movement data received, via satellite, from a respective satellite modem mounted to each data acquisition unit;
perform ambient noise tomography to generate tomography data based on the pre-processed ground-movement data;
generate a display of the ground region based on the tomography data viewable from a communicatively coupled user interface in near-real time relative to a data acquisition time of the ground movement; and
transmit the generated display to the communicatively coupled user interface, and
wherein each data acquisition unit includes a respective processor configured to perform the method according to claim 10.

12. A data acquisition unit for acquiring seismic data for performing ambient noise tomography (ANT) at a server system, including:
a closed housing including a top portion, a central portion and a lower portion, the lower portion including a vibration sensing portion for sensing vibration in a ground region;
a vibration transducer in the lower portion and configured to receive vibrations via the vibration sensing portion and generate an electrical output signal based on the received vibrations;
a processing unit in the housing to receive and pre-process the electrical output signal to form pre-processed ground movement data, and to process the pre-processed ground movement data to generate a data payload;
a synchronisation unit to receive a synchronisation signal from a satellite and to communicate synchronisation data to the processing unit based on the synchronisation signal;
a satellite modem coupled to the top portion;
a modem communication port for allowing communication between the satellite modem and the processing unit to transmit the data payload to a satellite;
a power source holding structure in the central portion, the power source holding structure for holding a power source in the central portion; and
a power supply in the central portion configured to supply power from the power source to the processing unit, the satellite modem and the synchronisation unit.

13. The data acquisition unit of claim 12, wherein the vibration transducer comprises a single geophone element received in the vibration sensing portion.

14. The data acquisition unit of claim 12, further including a first printed circuit board assembly (PCBA) contained in the housing, wherein the processing unit is included on the first PCBA.

15. The data acquisition unit of claim 14, wherein the synchronisation unit is included on the first PCBA.

16. The data acquisition unit of claim 14, further including a second PCBA contained in the housing, the second PCBA permitting communicative coupling between the processing unit and the satellite modem.

17. The data acquisition unit of claim 16, further including one or more connection points on the first PCBA and second PCBA for one or more cabled connections between the first PCBA and second PCBA, for permitting communicative coupling between the processing unit and the satellite modem.

18. The data acquisition unit of claim 16, wherein the top portion comprises an upper part, wherein the upper part is configured for receiving peripheral components, the upper part including one or more apertures for permitting cabled connections from the peripheral components to the first PCBA or second PCBA.

19. The data acquisition unit of claim 18, further including a first connector on the top portion for connecting a first synchronisation antenna, wherein a first aperture of the one or more apertures permits cabled connections from the connector to the first PCBA or second PCBA so that the first synchronisation antenna can be communicatively coupled to the synchronisation unit.

20. The data acquisition unit of claim 19, further including the first synchronisation antenna, wherein the first synchronisation antenna is a passive GNSS antenna.

* * * * *